US009743679B2

(12) United States Patent
Perez et al.

(10) Patent No.: US 9,743,679 B2
(45) Date of Patent: Aug. 29, 2017

(54) PLANT EXTRACT COMPOSITIONS AND METHODS OF PREPARATION THEREOF

(71) Applicant: aPEEL Technology, Inc., Santa Barbara, CA (US)

(72) Inventors: Louis Perez, Santa Barbara, CA (US); James Rogers, Santa Barbara, CA (US); Ronald C. Bakus, II, Santa Barbara, CA (US); Chance Holland, Goleta, CA (US); Jenny Du, Santa Barbara, CA (US)

(73) Assignee: aPEEL Technology, Inc., Goleta, CA (US)

( * ) Notice: Subject to any disclaimer, the term of this patent is extended or adjusted under 35 U.S.C. 154(b) by 0 days.

(21) Appl. No.: 15/254,263

(22) Filed: Sep. 1, 2016

(65) Prior Publication Data

US 2017/0049119 A1    Feb. 23, 2017

Related U.S. Application Data

(63) Continuation of application No. PCT/US2016/033617, filed on May 20, 2016.
(Continued)

(51) Int. Cl.
*B01D 11/02* (2006.01)
*B01D 37/00* (2006.01)
(Continued)

(52) U.S. Cl.
CPC ............. *A23B 7/154* (2013.01); *A23B 7/16* (2013.01); *A23L 3/3517* (2013.01);
(Continued)

(58) Field of Classification Search
CPC .. A23B 7/154; A23B 7/00; A23B 7/14; A23B 7/153; A23B 7/16; A23L 3/3517;
(Continued)

(56) References Cited

U.S. PATENT DOCUMENTS 2,342,063 A * 2/1944 Sells .................. A23B 7/16
239/590
3,189,467 A * 6/1965 Kalmar .................. A23B 7/154
426/308
(Continued)

FOREIGN PATENT DOCUMENTS

WO    WO 2004030455 A1    4/2004
WO    WO 2012042404 A2    4/2012
WO    WO 2015028299 A1    3/2015

OTHER PUBLICATIONS

Publication by Con J. Baker et al; "Cutin Degradation by Plant Pathogenic Fungi"; published May 15, 1978 by The American Phytopathological Society.*
(Continued)

*Primary Examiner* — Joseph Drodge
(74) *Attorney, Agent, or Firm* — Cooley LLP

(57) ABSTRACT

Embodiments described herein relate generally to plant extract compositions and methods to isolate cutin-derived monomers, oligomers, and mixtures thereof for application in agricultural coating formulations, and in particular, to methods of preparing plant extract compositions that include functionalized and non-functionalized fatty acids and fatty esters (as well as their oligomers and mixtures thereof), which are substantially free from accompanying plant-derived compounds (e.g., proteins, polysaccharides, phenols, lignans, aromatic acids, terpenoids, flavonoids, carotenoids, alkaloids, alcohols, alkanes, and aldehydes) and can be used in agricultural coating formulations.

30 Claims, 10 Drawing Sheets

Related U.S. Application Data

(60) Provisional application No. 62/164,312, filed on May 20, 2015.

(51) Int. Cl.
*A23B 7/16* (2006.01)
*A23B 7/154* (2006.01)
*A23L 3/3517* (2006.01)

(52) U.S. Cl.
CPC ...... *B01D 11/0284* (2013.01); *B01D 11/0288* (2013.01); *B01D 37/00* (2013.01); *A23V 2002/00* (2013.01)

(58) Field of Classification Search
CPC ... A23L 3/00; A23L 5/30; A23L 19/00; A23V 2002/00; B01D 11/02; B01D 11/028; B01D 11/0284; B01D 11/0288; B01D 36/00; B01D 37/00; C07C 51/42; C07C 51/47; C07C 51/48; C07C 51/487; C07C 51/493; C11B 1/00; C11B 1/10; C11B 1/108; C11B 3/00; C11B 3/006; C11B 3/008; C11B 3/02
USPC .... 210/634, 639, 806; 426/89, 90, 302, 303, 426/310, 615; 554/8, 20, 21, 29, 30, 174, 554/175
See application file for complete search history.

(56) References Cited

U.S. PATENT DOCUMENTS

| | | | |
|---|---|---|---|
| 4,421,775 A | 12/1983 | Chan | |
| 4,710,228 A | 12/1987 | Seaborne et al. | |
| 4,732,708 A * | 3/1988 | Ekman | C07C 51/09 554/138 |
| 5,110,509 A | 5/1992 | Peter et al. | |
| 5,354,573 A * | 10/1994 | Gross | A23D 7/0053 106/244 |
| 5,658,768 A | 8/1997 | Quinlan | |
| 5,827,553 A | 10/1998 | Dimitroglou et al. | |
| 5,925,395 A | 7/1999 | Chen et al. | |
| 5,939,117 A | 8/1999 | Chen et al. | |
| 6,254,645 B1 | 7/2001 | Kellis et al. | |
| 6,255,451 B1 | 7/2001 | Koch et al. | |
| 6,348,217 B1 | 2/2002 | Santos et al. | |
| 7,785,897 B2 | 8/2010 | Agnes et al. | |
| 7,851,002 B2 | 12/2010 | Hekal et al. | |
| 7,931,926 B2 | 4/2011 | Lidster et al. | |
| 7,943,336 B2 | 5/2011 | Viksoe-Nielsen et al. | |
| 8,101,221 B2 | 1/2012 | Chen et al. | |
| 8,119,178 B2 | 2/2012 | Lidster et al. | |
| 8,197,870 B2 | 6/2012 | Krasutsky et al. | |
| 8,247,609 B2 | 8/2012 | Roques et al. | |
| 8,263,751 B2 | 9/2012 | Peterson | |
| 8,424,243 B1 | 4/2013 | Narciso et al. | |
| 8,501,445 B2 | 8/2013 | Yoshikawa et al. | |
| 8,546,115 B2 | 10/2013 | Butchert et al. | |
| 8,609,169 B2 | 12/2013 | Chen et al. | |
| 8,752,328 B2 | 6/2014 | Kaiser et al. | |
| 8,846,355 B2 | 9/2014 | Yoshikawa et al. | |
| 9,095,152 B2 | 8/2015 | Munger | |
| 9,102,125 B2 | 8/2015 | Battersby et al. | |
| 9,284,432 B2 | 3/2016 | Yoshikawa et al. | |
| 2005/0249856 A1 * | 11/2005 | Marangoni | A23D 7/013 426/601 |
| 2008/0038471 A1 | 2/2008 | Boger et al. | |
| 2008/0262190 A1 | 10/2008 | Koskimies et al. | |
| 2009/0142453 A1 | 6/2009 | Lobisser et al. | |
| 2009/0325240 A1 | 12/2009 | Daniell | |
| 2013/0209617 A1 | 8/2013 | Lobisser et al. | |
| 2014/0033926 A1 | 2/2014 | Fassel et al. | |
| 2014/0199449 A1 * | 7/2014 | Hernandez | A23B 7/0441 426/310 |
| 2014/0234921 A1 * | 8/2014 | Nyyssola | D21C 5/005 435/135 |
| 2014/0348945 A1 | 11/2014 | Dong et al. | |

OTHER PUBLICATIONS

Publication by Osman et al, "Preparation, Isolation, and Characterization of Cutin Monomers and Oligomers from Tomato Peels", Journal of Agric. Food Chem., vol. 47, Published 1999, pp. 799-802.*

Andrade, R. D. et al., 2012, "Atomizing spray systems for application of edible coatings", *Comprehensive Reviews in Food Science and Food Safety*, 11(3): 323-337.

Ayala-Zavala, J.F. et al., 2008, "High Relative Humidity In-Package of Fresh-Cut Fruits and Vegetables: Advantage or Disadvantage Considering Microbiological Problems and Antimicrobial Delivering Systems?" *J. Food Science* 73:R41-R47.

Ben-Yehoshua, S. et al., 1998, "Modified-atmosphere packaging of fruits and vegetables: reducing condensation of water in bell peppers and mangoes", *Acta Hort* (ISHS) 464:387-92.

Bourtoom, T., 2008, "Edible films and coatings: characteristics and properties", *International Food Research Journal*, 15(3): 237-248.

Deell, J.R. et al., 2006, "Addition of sorbitol with KMnO4 improves broccoli quality retention in modified atmosphere packages", *J. Food Qual.* 29:65-75.

Roy, S. et al., 1996, "Modified atmosphere and modified humidity packaging of fresh mushrooms", *J. Food Sci.* 61:391-7.

Shirazi, A., and Cameron, A., 1992, "Controlling relative humidity in modified atmosphere packages of tomato fruit." *HortScience* 27:336-9.

* cited by examiner

| Sample ID | Weight (µg) | Weight Percent C | H | N | C/N ratio | Flags |
|---|---|---|---|---|---|---|
| AL5155 | 1352 | 65.32% | 10.62% | 0.32% | 207.35 | N<DL |
| AL5155 R | 1159 | 65.46% | 10.61% | 0.32% | 203.59 | N<DL |

| Detection Limit (µg) | C | H | N |
|---|---|---|---|
| | 1.3 | 3.1 | 5.0 |

Chemical Formula: $C_{16}H_{32}O_4$
m/z: 288.23 (100.0%), 289.23 (17.3%), 290.24 (1.4%)
Elemental Analysis: C, 66.63; H, 11.18; O, 22.19

PLANT EXTRACT COMPOSITIONS AND METHODS OF PREPARATION THEREOF

CROSS-REFERENCE TO RELATED APPLICATIONS

This application is a continuation of PCT/US2016/033617, filed May 20, 2016, which claims priority to and the benefit of U.S. Provisional Patent Application Ser. No. 62/164,312, entitled "Plant Extract Compositions and Methods of Preparation Thereof," filed May 20, 2015, the disclosure of which are hereby incorporated by reference in their entirety.

BACKGROUND

The present disclosure relates to plant extract compositions, and to methods of forming the same. Common agricultural products are susceptible to degradation and decomposition (i.e., spoilage) when exposed to the environment. Such agricultural products can include, for example, eggs, fruits, vegetables, produce, seeds, nuts, flowers, and/or whole plants (including their processed and semi-processed forms). Non-agricultural products (e.g., vitamins, candy, etc.) are also vulnerable to degradation when exposed to the ambient environment. The degradation of the agricultural products can occur via abiotic means as a result of evaporative moisture loss from an external surface of the agricultural products to the atmosphere and/or oxidation by oxygen that diffuses into the agricultural products from the environment and/or mechanical damage to the surface and/or light-induced degradation (i.e., photodegradation). Furthermore, biotic stressors such as, for example, bacteria, fungi, viruses, and/or pests can also infest and decompose the agricultural products.

Conventional approaches to preventing degradation, maintaining quality, and increasing the life of agricultural products include refrigeration and/or special packaging. Refrigeration requires capital-intensive equipment, demands constant energy expenditure, can cause damage or quality loss to the product if not carefully controlled, must be actively managed, and its benefits are lost upon interruption of a temperature-controlled supply chain. Special packaging can also require expensive equipment, consume packaging material, increase transportation costs, and require active management. Despite the benefits that can be afforded by refrigeration and special packaging, the handling and transportation of the agricultural products can cause surface abrasion or bruising that is aesthetically displeasing to the consumer and serves as points of ingress for bacteria and fungi. Moreover, the expenses associated with such approaches can add to the cost of the agricultural product.

The cells that form the aerial surface of most plants (such as higher plants) include an outer envelope or cuticle, which provides varying degrees of protection against water loss, oxidation, mechanical damage, photodegradation, and/or biotic stressors, depending upon the plant species and the plant organ (e.g., fruit, seeds, bark, flowers, leaves, stems, etc.). Cutin, which is a biopolyester derived from cellular lipids, forms the major structural component of the cuticle and serves to provide protection to the plant against environmental stressors (both abiotic and biotic). The thickness, density, as well as the composition of the cutin (i.e., the different types of monomers that form the cutin and their relative proportions) can vary by plant species, by plant organ within the same or different plant species, and by stage of plant maturity. The cutin-containing portion of the plant can also contain additional compounds (e.g., epicuticular waxes, phenolics, antioxidants, colored compounds, proteins, polysaccharides, etc.). This variation in the cutin composition as well as the thickness and density of the cutin layer between plant species and/or plant organs and/or a given plant at different stages of maturation can lead to varying degrees of resistance between plant species or plant organs to attack by environmental stressors (i.e., water loss, oxidation, mechanical injury, and light) and/or biotic stressors (e.g., fungi, bacteria, viruses, insects, etc.).

SUMMARY

Embodiments described herein relate generally to plant extract compositions and methods to isolate cutin-derived monomers, oligomers, and mixtures thereof for application in agricultural coating formulations, and in particular, to methods of preparing plant extract compositions that include functionalized and non-functionalized fatty acids and fatty esters (as well as their oligomers and mixtures thereof), which are substantially free from accompanying plant-derived compounds (e.g., proteins, polysaccharides, phenols, lignans, aromatic acids, terpenoids, flavonoids, carotenoids, alkaloids, alcohols, alkanes, and aldehydes) and can be used in agricultural coating formulations.

In some embodiments, a method for preparing a plant extract composition includes thermally and/or mechanically and/or enzymatically and/or chemically treating the plant matter to at least partially separate a cutin-containing portion from the plant matter. In some embodiments, the plant matter is subjected to elevated temperature and/or pressure in an aqueous medium (e.g., as in pressure cooking) to partially separate a cutin-containing portion from the plant matter. Alternatively, the plant matter may be subjected to lower temperatures (e.g., as in freezing) to partially separate a cutin-containing portion from the plant matter. In some embodiments, the plant matter is subjected to sonication in an aqueous medium to partially separate a cutin-containing portion from the plant matter. Optionally, the cutin-containing portion is heated in a mixture of ammonium oxalate and oxalic acid to aid separation of the cutin from the non-cutin-containing portion (i.e., the remainder of the cuticle and unwanted plant matter). Optionally, this separation can be achieved (or assisted) enzymatically using enzymes capable of hydrolyzing ester bonds and/or alternatively using enzymes capable of breaking down polysaccharides that comprise the non-cutin-containing portion of the plant. Optionally, the cutin-containing portion is refluxed in at least one organic solvent (such as chloroform and/or methanol) to remove residual waxes and/or any remaining soluble polar components from the cutin. Alternatively, removal of residual waxes and remaining soluble components can be achieved using supercritical $CO_2$ or supercritical $H_2O$. The cutin is then refluxed in a solvent having a high pH (e.g., in the range of about 10 to 14, and typically in the range of 12 to 14), for example a solvent in which metal alkoxide or metal hydroxide (or alternative source of alkoxide or hydroxide) is dissolved, to at least partially depolymerize the cutin and obtain an intermediate extract including a plurality of esterified or fatty acid cutin monomers, their oligomers, or mixtures thereof. In cases where the intermediate extract is obtained from (metal) alkoxide-mediated depolymerization, the pH of the intermediate extract is then adjusted to be in the range of about 6.5 to 9.0. In cases where the intermediate extract obtained from (metal) hydroxide-mediated depolymerization, the pH of the intermediate extract is then adjusted to be in the range of about 1.0 to 6.0.

Alternatively, the cutin can be at least partially depolymerized under acidic conditions to obtain an intermediate extract including a plurality of fatty acid cutin monomers, oligomers, or mixtures thereof. The intermediate extract is then precipitated and/or extracted and purified (such as by washing with one or more selective solvents) to obtain the plant extract such that the plant extract is substantially free from accompanying plant-derived compounds (e.g., proteins, polysaccharides, phenols, lignans, aromatic acids, terpenoids, flavonoids, carotenoids, alkaloids, alcohols, alkanes, and aldehydes). Further purification by chromatography or recrystallization in a selective solvent may also be carried out after washing to obtain the final extract.

In some embodiments, a method for preparing a plant extract composition includes obtaining cutin from a cutin-containing portion of a plant matter, the cutin-containing portion being at least partially separated from a non-cutin-containing portion of the plant matter, and at least partially depolymerizing the cutin in a first solvent to obtain a first solution comprising a first intermediate extract dissolved in the first solvent, wherein the first solution has a pH in the range of 10 to 14, and the first intermediate extract includes a plurality of cutin-derived monomers, oligomers, or combinations thereof. The method further includes evaporating at least a portion of the first solvent, causing the first intermediate extract to solidify, dissolving the solidified first intermediate extract in a polar solvent to obtain a second solution, and acidifying the second solution, causing the first intermediate extract to resolidify.

In some embodiments, a method for preparing a plant extract composition includes obtaining cutin from a cutin-containing portion of a plant matter, the cutin-containing portion being at least partially separated from a non-cutin-containing portion of the plant matter, and at least partially depolymerizing the cutin in a first solvent to obtain a first solution comprising a first intermediate extract dissolved in the first solvent, wherein the first intermediate extract includes a plurality of cutin-derived monomers, oligomers, or combinations thereof. The method further includes acidifying the first intermediate extract, selectively filtering the first intermediate extract to obtain a second intermediate extract having a higher purity than the first intermediate extract, and dissolving the second intermediate extract in a second solvent to obtain the plant extract composition.

In some embodiments, a method for preparing a plant extract composition includes obtaining cutin from a cutin-containing portion of a plant matter, the cutin-containing portion being at least partially separated from a non-cutin-containing portion of the plant matter, and at least partially depolymerizing the cutin in a first solvent to obtain a first solution comprising a first intermediate extract dissolved in the first solvent, wherein the first solution has a pH in the range of 10 to 14, and the first intermediate extract includes a plurality of cutin-derived monomers, oligomers, or combinations thereof. The method further includes evaporating at least 25% of a volume of the first solvent from the solution, adding a polar solvent to the first solution to obtain a second solution, and acidifying the second solution, causing the first intermediate extract to precipitate.

In some embodiments, a method for preparing a plant extract composition includes obtaining cutin from a cutin-containing portion of a plant matter, the cutin-containing portion being at least partially separated from a non-cutin-containing portion of the plant matter, and exposing the compound to supercritical carbon dioxide to selectively reduce a concentration of at least one of proteins, polysaccharides, phenols, lignans, aromatic acids, terpenoids, flavonoids, carotenoids, alkaloids, alcohols, alkanes, aldehydes, and waxes. The method further includes at least partially depolymerizing the cutin in a first solvent to obtain a first solution comprising a first intermediate extract dissolved in the first solvent, wherein the first solution has a pH in the range of 10 to 14, and the first intermediate extract includes a plurality of cutin-derived monomers, oligomers, or combinations thereof. The method also includes acidifying the first intermediate extract and obtaining the plant extract composition, wherein the plant extract composition comprises a second solution comprising the monomers, oligomers, or combinations thereof dissolved in a second solvent.

In some embodiments, a method for preparing a plant extract composition includes obtaining cutin from a cutin-containing portion of a plant matter, the cutin-containing portion being at least partially separated from a non-cutin-containing portion of the plant matter, and at least partially depolymerizing the cutin in a first solvent having a pH in the range of 10 to 14 to obtain a first solution comprising a first intermediate extract dissolved in the first solvent, wherein the first intermediate extract includes a plurality of cutin-derived monomers, oligomers, or combinations thereof. The method further includes acidifying the first solution, selectively filtering the first solution to remove impurity constituents, at least partially evaporating the first solvent to cause the first intermediate extract to solidify, and dissolving the first intermediate extract in a second solvent.

In some embodiments, a method of preparing a plant extract composition includes obtaining cutin from a cutin-containing portion of a plant matter, the cutin-containing portion being at least partially separated from a non-cutin-containing portion of the plant matter and at least partially depolymerizing the cutin in a first solvent to obtain a first solution comprising a first intermediate extract in the first solvent, the first intermediate extract including a plurality of cutin-derived monomers, oligomers, or combinations thereof. The method further includes selectively filtering the first intermediate extract to obtain a second intermediate extract having a higher purity than the first intermediate extract, the second intermediate extract including at least one of the cutin-derived monomers, oligomers, or combinations thereof, and functionalizing the cutin-derived monomers, oligomers, or combinations thereof of the second intermediate extract to form the plant extract composition.

In some embodiments, a method of protecting an agricultural product from biotic stress includes obtaining a plant extract composition comprising a plurality of cutin-derived monomers, oligomers, or combinations thereof, functionalizing the cutin-derived monomers, oligomers, or combinations thereof by esterifying the cutin-derived monomers, oligomers, or combinations thereof with a glycerol molecule, and causing the agricultural product to be coated with the functionalized cutin-derived monomers, oligomers, or combinations thereof.

In some embodiments, a method of prolonging the life of an agricultural product includes obtaining a plant extract comprising a plurality of cutin-derived monomers, oligomers, or combinations thereof, functionalizing the cutin-derived monomers, oligomers, or combinations thereof by esterifying the cutin-derived monomers, oligomers, or combinations thereof with a glycerol molecule, and causing the agricultural product to be coated with the functionalized cutin-derived monomers, oligomers, or combinations thereof.

DETAILED DESCRIPTION

Figure 1:
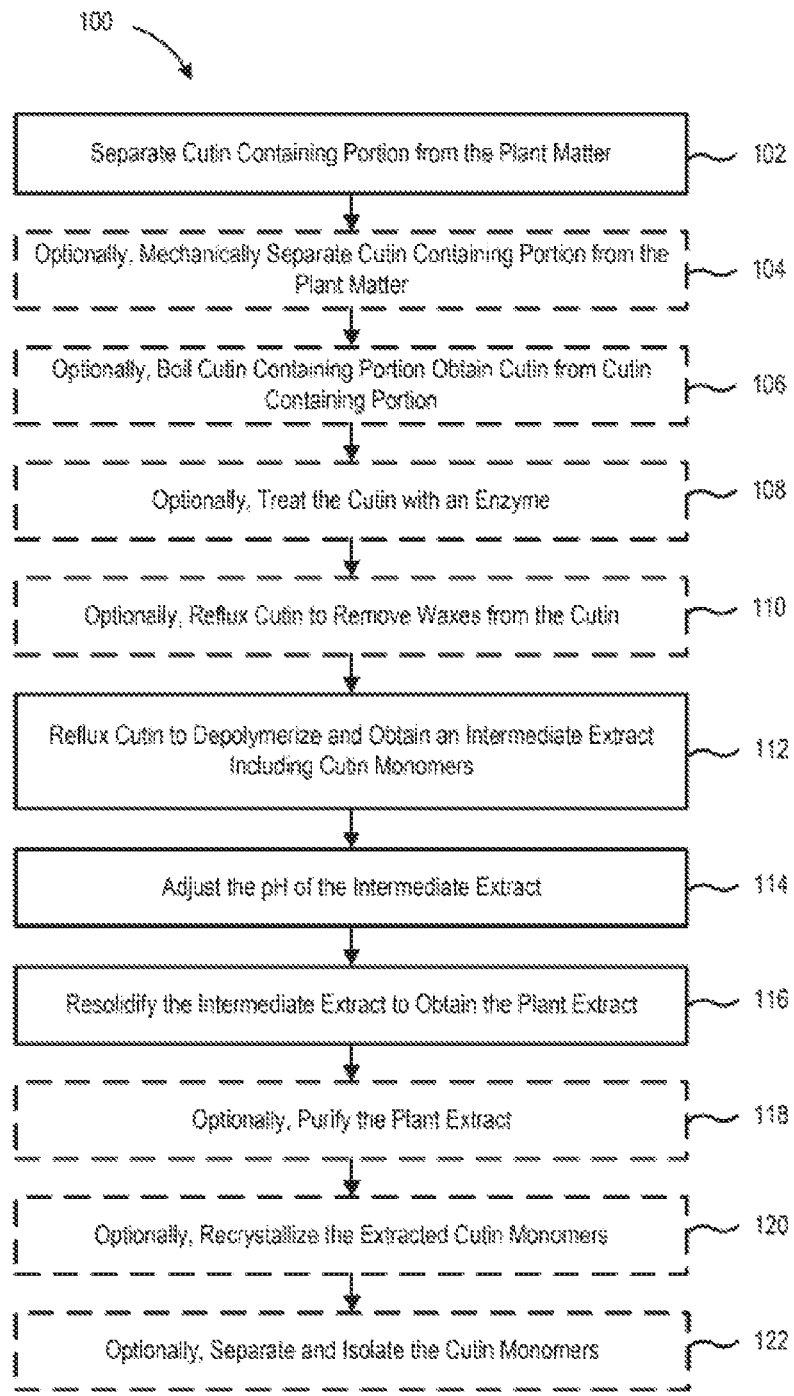
FIG. 1 is a schematic flow diagram of an exemplary method for preparing a plant extract composition, according to an embodiment.

The biopolyester cutin forms the main structural component of the cuticle that composes the aerial surface of most land plants and plays a significant role in providing plants a protective barrier against both abiotic and biotic stressors. The thickness, density, as well as the composition of the cutin (i.e., the different types of monomers that form the cutin and their relative proportions) can vary by plant species, by plant organ within the same or different plant species, and by stage of plant maturity. These variations can define the amount, degree, or quality of protection (and degree of plasticity) offered by the cutin layer to the plant or plant organ against environmental and/or biotic stressors. Cutin is formed from a mixture of polymerized mono- and/or polyhydroxy fatty acids and embedded cuticular waxes. Among the hydroxy fatty acids, polyhydroxy fatty acids (e.g., dihydroxy fatty acids or trihydroxy fatty acids), once esterified, can form tightly bound networks with high crosslink density and lower permeability as compared to monohydroxy fatty acids and can thereby provide better protection against environmental stressors.

Embodiments described herein relate generally to plant extract compositions and, in particular, to methods of preparing plant extract compositions that include hydroxy fatty acids and hydroxy fatty esters (as well as their oligomers and mixtures thereof), which are substantially free from accompanying plant-derived compounds (e.g., proteins, polysaccharides, phenols, lignans, aromatic acids, terpenoids, flavonoids, carotenoids, alkaloids, alcohols, alkanes, and aldehydes) and can be used in agricultural coating formulations. Specifically, plant extract compositions described herein that are formed from plant matter can subsequently be applied to other plant or agricultural products in order to form a protective coating over the products, or to enhance or modify existing coatings (either naturally occurring or deposited coatings) which are on the outer surface of the products. The applied coatings can, for example, serve to protect the products from biotic stressors such as bacteria, fungi, viruses, and/or pests. The applied coatings can also (or alternatively) serve to increase the shelf life of produce without refrigeration, and/or to control the rate of ripening of produce.

In some embodiments, in order to achieve one or more of the benefits described above for applications in which an agricultural coating is subsequently formed from a plant extract composition derived from plant matter, it may be necessary for the plant extract composition to be highly purified, e.g., to include the monomer and/or oligomer units that form the structural building blocks of the coatings and to simultaneously be substantially free of other accompanying plant-derived compounds such as proteins, polysaccharides, phenols, lignans, aromatic acids, terpenoids, flavonoids, carotenoids, alkaloids, alcohols, alkanes, and aldehydes. In particular, plant extracts to be used in agricultural coating applications typically need a substantially higher level of purity than when extracted for other applications (e.g., characterization of plant matter). In some cases, achieving the required level of purity requires a number of additional steps that may not be advantageous or desirable in other applications.

The plant extract compositions described herein can be derived or obtained in a number of ways. For example, in some embodiments the compositions are derived directly from a cutin-containing portion of plant matter, such as by depolymerizing (or at least partially depolymerizing) the cutin to obtain a plurality of cutin-derived monomers, oligomers, or combinations thereof, and optionally functionalizing (e.g., modifying) the cutin-derived monomers or oligomers. Alternatively, in other embodiments the plant extract compositions are obtained by decomposition of palm oil, and optionally subsequently functionalizing (e.g., modifying) the monomers or oligomers obtained by the palm oil decomposition. In still other embodiments, the plant extract compositions are obtained from commercial sources, for example by purchasing monomers, oligomers, or combinations thereof which were derived or formed by one of the methods described above, or by other methods.

As described above, the compositions of the present disclosure can be derived or obtained from commercial sources. For instance, compositions can be made by functionalizing a commercially available fatty acid (e.g., palmitic acid or 10, 16-dihydroxyhexadecanoic acid). The fatty acids thus obtained can be functionalized to improve their properties as coatings for agricultural products. For example, in some embodiments, a fatty acid (e.g., a commercially available fatty acid or a fatty acid extracted from plant cutin) is esterified. The esterification can be completed directly via the reaction of the free carboxylic acid with an appropriate alcohol. Alternatively, the esterification can be completed by transesterification of a fatty acid ester (e.g., methyl palmitate) with an appropriate alcohol.

In some embodiments, the cutin-derived monomers, oligomers, or combinations thereof (e.g., the fatty acid compositions) of the present disclosure are functionalized to their corresponding glycerol esters (e.g., 1-glycerol or 2-glycerol esters). That is, a fatty acid of the present disclosure (e.g., palmitic acid) can be esterified using glycerol or a derivative thereof to give a fatty acid ester of glycerol (e.g., 1,3-dihydroxypropan-2-yl palmitate or 2,3-dihydroxypropyl palmitate).

As set forth in the present disclosure, functionalized fatty acids (e.g., fatty acid-glycerol esters) can have advantageous properties that help to preserve agricultural produce when applied to the surface of the produce (e.g., can prolong the shelf life of agricultural produce). In some embodiments, substantially all of the fatty acids in the compositions described herein are esterified with a glycerol molecule. For instance, both commercially derived fatty acids as well as fatty acids extracted from plant compositions can be functionalized as a glycerol ester.

In some embodiments, the monomer and/or oligomer units of the plant extract compositions described herein can be applied to the surface of an agricultural product that does not naturally produce the monomer and/or oligomer units. For instance, the monomer and/or oligomer units can comprise a plurality of fatty acids that can be commercially available or extracted from plant matter. These compositions can be applied to agricultural products that do not naturally produce, for instance, the same types of fatty acids. In one example, a composition of monomers and/or oligomers derived from palmitic acid can be applied to an agricultural product that does not naturally produce palmitic acid.

Additionally, in some embodiments, the monomer and/or oligomers units of the compositions described herein can be functionalized and applied to agricultural products that do not naturally produce such functionalization. For instance, a glycerol-ester of a fatty acid (e.g., 1,3-dihydroxypropan-2-yl palmitate or 2,3-dihydroxypropyl palmitate or a combination thereof) can be applied to the surface of an agricultural product that does not naturally produce glycerol-functionalized fatty acids.

In some embodiments, the addition of non-naturally occurring (e.g., functionalized) monomer and/or oligomer units of the plant extract (e.g., fatty acids) can have beneficial properties when applied to produce to form a coating. For instance, the coatings can reduce moisture loss from the produce and/or reduce microbial growth on the surface of the produce.

In some embodiments, the monomer and/or oligomer units of the plant extract compositions are obtained from cutin found in plant matter (e.g., extracted from plant matter such as plant waste from other applications). Extracting the monomer and/or oligomer units of plant extract can be performed instead of purchasing fatty acids from commercial sources, or as a supplement to fatty acids from commercial sources. Plant matter typically includes some portions that contain cutin and/or have a high density of cutin (e.g., fruit peels, leaves, shoots, etc.), as well as other portions that do not contain cutin or have a low density of cutin (e.g., fruit flesh, seeds, etc.). The cutin-containing portions can be formed from the monomer and/or oligomer units and can also include other constituents such as proteins, polysaccharides, phenols, lignans, aromatic acids, terpenoids, flavonoids, carotenoids, alkaloids, alcohols, alkanes, and aldehydes. The non-cutin-containing portions typically lack the monomer and/or oligomer units, or otherwise include a much lower ratio of monomer and/or oligomer units to other constituents as compared to the cutin-containing portions.

Methods described herein for forming plant extract compositions from cutin can generally include first separating (or at least partially separating) cutin-containing portions of plant matter from non-cutin-containing portions, and obtaining cutin from the cutin-containing portions (e.g., when the cutin-containing portion is a fruit peel, the cutin is separated from the peel). The cutin is then depolymerized (or at least partially depolymerized) in a first solvent to obtain a first solution comprising a first intermediate extract dissolved in the first solvent, the first intermediate extract including a plurality of fatty acid or esterified cutin monomers, oligomers, or combinations thereof. The first solvent (and therefore the resulting first solution) typically has a pH in the range of 10 to 14, in order to enable the depolymerization process. The high pH indicates that the extract is substantially deprotonated. In some embodiments, the first solvents and/or the first solution has a pH in the range of 12 to 14. Following depolymerization, the extract including the monomer and/or oligomer units is acidified in order for the monomer and/or oligomer units to be protonated or rendered neutral (i.e., to generate the corresponding free fatty acids and/or fatty esters and to be in a state that enables them to subsequently form an agricultural coating). Finally, the extract including the free fatty acid and/or free fatty ester monomer and/or oligomer units is dissolved in another solvent, thereby resulting in a plant extract composition suitable for agricultural coating applications.

Because the cutin obtained from the cutin-containing portion is typically intermixed with many of the other constituents described above, the extract obtained from the depolymerization process may have a higher level of impurity constituents than can be tolerated in agricultural coating applications. As such, the cutin and/or the extract composition and/or the solution containing the extract composition can be purified by selectively removing or filtering out the impurity constituents. Selective filtering can occur either before or after the depolymerization process, or both before and after depolymerization. Selective filtering may include one or more of the following processes:

(a) Prior to depolymerizing or partly depolymerizing the cutin, washing and/or heating the cutin in a selective solvent for which the solubility of impurity constituents in the selective solvent is higher than the solubility of the cutin. In this case, impurities are dissolved into the selective solvent, thereby resulting in fewer impurities in the first intermediate extract. In some embodiments, impurities are dissolved into the selective solvent immediately after depolymerization. Examples of such a solvent can include chloroform, diethyl ether, dichloromethane, hexane, petroleum ether, ethyl acetate, acetone, isopropanol, ethanol, methanol, supercritical carbon dioxide, supercritical water, water, and mixtures thereof.

(b) After depolymerizing or partly depolymerizing the cutin to obtain the first solution comprising the first intermediate extract dissolved in the first solvent, and prior to acidifying the first intermediate extract, washing and/or heating the first intermediate extract in a selective solvent (e.g., acetonitrile) for which the solubility of impurity constituents in the selective solvent is lower than the solubility of the monomers and/or oligomers. In this case, the monomers and/or oligomers are dissolved into the selective solvent while the impurities are not. The impurities can then be filtered out, resulting in a second intermediate extract dissolved in the selective solvent, whereby the second intermediate extract has a higher purity than the first intermediate extract. The second intermediate extract may subsequently be solidified, e.g., by evaporating the selective solvent.

(c) After depolymerizing or partly depolymerizing the cutin to obtain the first solution comprising the first intermediate extract dissolved in the first solvent, and prior to acidifying the first intermediate extract, washing and/or heating the first intermediate extract in a selective solvent (e.g., chloroform or hexane) for which the solubility of impurity constituents in the selective solvent is higher than the solubility of the monomers and/or oligomers. In this case, impurities are dissolved into the selective solvent, thereby removing the impurities from the extract, and a second intermediate extract having a higher purity than the first intermediate extract is obtained.

(d) After depolymerizing or partly depolymerizing the cutin to obtain the first solution comprising the first intermediate extract dissolved in the first solvent, and after subsequently acidifying the first intermediate extract, washing and/or heating the first intermediate extract in a selective solvent (e.g., acetonitrile) for which the solubility of impurity constituents in the selective solvent is lower than the solubility of the monomers and/or oligomers. In this case, the monomers and/or oligomers are dissolved into the selective solvent while the impurities are not. The impurities can then be filtered out, resulting in a second intermediate extract dissolved in the selective solvent, whereby the second intermediate extract has a higher purity than the first intermediate extract. The second intermediate extract may subsequently be solidified, e.g., by evaporating the selective solvent.

(e) After depolymerizing or partly depolymerizing the cutin to obtain the first solution comprising the first intermediate extract dissolved in the first solvent, and after subsequently acidifying the first intermediate extract, washing and/or heating the first intermediate extract in a selective solvent (e.g., chloroform or hexane) for which the solubility of impurity constituents in the selective solvent is higher than the solubility of the monomers and/or oligomers. In this case, impurities are dissolved into the selective solvent, thereby removing the impurities from the extract, and a second intermediate extract having a higher purity than the first intermediate extract is obtained.

(f) After obtaining a compound comprising cutin from a cutin-containing portion of plant matter and prior to depolymerizing or partly depolymerizing the cutin, exposing the compound to supercritical carbon dioxide to selectively reduce a concentration of at least one of proteins, polysaccharides, phenols, lignans, aromatic acids, terpenoids, flavonoids, carotenoids, alkaloids, alcohols, alkanes, aldehydes, and waxes.

(g) After depolymerizing or partly depolymerizing the cutin to obtain the first solution comprising the first intermediate extract dissolved in the first solvent, and either prior to or after acidifying the first intermediate extract, filtering the solution to remove undissolved impurity constituents, for example by passing the solution through a filter.

In some embodiments, at least a portion of the plant extract can include monomers that include multiple functional groups (e.g., one of at least hydroxyl, carboxyl, epoxy, olefin, etc.). For example, in some embodiments, the monomers can include multiple functional groups of the same type (e.g., dihydroxy- and trihydroxy-substituted). In some embodiments, the monomers can include multiple functional groups, at least one of which is different than the remaining functional group(s) (i.e., includes more than one type of functional group). These functional groups can be chemically reactive, allowing the formation of highly crosslinked networks, unlike their monofunctional analogs (which form dimers), or their di-functional analogs (which can polymerize into linear chains). The barrier properties (i.e., the ability of such extracts to form an effective agricultural coating/ barrier against biotic or abiotic stressors) are generally controlled by the chemical composition and degree of crosslinking. Polyhydroxy fatty acids (as well as their monomeric esters and oligomers) are multifunctional and thus capable of forming highly crosslinked polymers. However, such polyhydroxy fatty acids are not currently commercially available. Thus, such hydroxy fatty acids can either be synthesized or obtained from a suitable biological source. Since the cutin of many plants and/or plant organs (e.g., fruit peels, juice sac, leaves, shoots, etc.) is composed of mono- and polyhydroxy fatty acids (or can be decomposed into mono- or polyhydroxy fatty acids), an extract composition from such plants and/or plant organs can provide a suitable biological source of mono- and/or polyhydroxy fatty acids.

In some embodiments, the cutin monomers included in the plant extract compositions described herein can be mono- and/or polyhydroxy fatty acids and/or esters thereof in a combination suitable for use in coating formulations, e.g. for protecting plant species against environmental and/ or biotic stressors. Since bacteria, fungi, and pests all identify food sources via recognition of specific molecules on the surface of agricultural products, coating agricultural products with a formulation that includes embodiments of the plant extract compositions described herein can render the agricultural products unattractive or unrecognizable to said bacteria, fungi, and pests. Such formulations can, for example, also alter the chemical environment of the surface of agricultural products, making the surface unfavorable for bacteria, fungi, or pests to grow. Moreover, such formulations can also be configured to simultaneously prevent moisture loss from agricultural products and/or their oxidation by ambient air and/or impart resistance to mechanical damage and/or photodegradation and/or delay ripening, thereby minimizing decomposition and increasing the life of the agricultural products by aiding in resistance to abiotic stressors.

Embodiments of the plant extract compositions described herein can be synthesized or extracted from plant matter, including agricultural waste products, and can be included in coating formulations for protecting agricultural products from environmental and biotic stressors. Embodiments of the plant extract compositions described herein provide several advantages, including, for example: (1) formation of agricultural coating formulations that can protect the agricultural products from biotic stressors (i.e., bacteria, viruses, fungi, or pests); (2) formation of agricultural coating formulations that can prevent evaporation of water and/or diffusion of oxygen and/or other gaseous species (e.g., carbon dioxide and ethylene); (3) extension of the shelf life of agricultural products, for example, postharvest produce, without refrigeration; (4) introduction of mechanical stability to the surface of the agricultural products, helping to prevent the types of bruising and surface rupture that accelerate spoilage; (5) reduction of photodegradation of the agricultural products; (6) use of agricultural waste materials to obtain the plant extract compositions, which in turn help eliminate the breeding environments of bacteria, fungi, and pests, and divert materials away from landfills; (7) use in place of pesticides to protect plants, thereby minimizing the harmful impact of pesticides to human health and the environment; and (8) extraction from natural and/or edible waste products, making the plant extract compositions safe for human consumption.

A method for preparing a plant extraction composition can include thermally and/or mechanically and/or enzymatically and/or chemically treating the plant matter to at least partially separate the cutin-containing portion from the non-cutin-containing portion of the plant matter. In some embodiments, the plant matter is subjected to elevated temperature and/or pressure in an aqueous medium (e.g., as in pressure cooking) to partially separate the cutin-containing portion from the non-cutin-containing portion of the plant matter. Alternatively, the plant matter may be subjected to lower temperatures (e.g., as in freezing) to partially separate the cutin-containing portion from the non-cutin-containing portion of the plant matter. In some embodiments, the plant matter is subjected to sonication in an aqueous medium to partially separate the cutin-containing portion from the non-cutin-containing portion of the plant matter. Optionally, the cutin-containing portion is heated in a mixture of ammonium oxalate and oxalic acid to aid separation of the cutin from the non-cutin-containing portion (i.e., the remainder of the cuticle and unwanted plant matter). Optionally, this separation can be achieved (or assisted) enzymatically using enzymes capable of hydrolyzing ester bonds and/or alternatively using enzymes capable of breaking down polysaccharides that comprise the non-cutin-containing portion of the plant. Optionally, the cutin-containing portion is refluxed in at least one organic solvent (such as chloroform and/or methanol) to remove residual waxes and/or any remaining soluble polar components from the cutin. Alternatively, removal of residual waxes and remaining soluble components can be achieved using supercritical $CO_2$ or supercritical $H_2O$.

The cutin (or cutin-containing component) obtained from the plant matter is then refluxed in a solvent having a high pH (e.g., in the range of about 10 to 14, and typically in the range of 12 to 14), for example a solvent which is alkalized with metal alkoxide or metal hydroxide (or alternative source of alkoxide or hydroxide) to at least partially depolymerize the cutin and obtain an intermediate extract including a plurality of esterified or fatty acid cutin monomers, their oligomers, or mixtures thereof. The high pH solvent can be one in which the monomers and/or oligomers are highly soluble, but one or more of the other constituents of the cutin-containing compound (e.g., proteins, polysaccharides, phenols, lignans, aromatic acids, terpenoids, flavonoids, carotenoids, alkaloids, alcohols, alkanes, and aldehydes) is insoluble or is less soluble than the monomers and/or oligomers. As such, after the depolymerization process, the non-dissolved impurities can be filtered from the solution. In some embodiments, the high-pH solvent includes ethanol, methanol, or another alcohol having metal (e.g., sodium metal), metal alkoxide, or metal hydroxide dissolved within.

In some embodiments, the high-pH solvent is substantially free of water (e.g., less than 5% water by mass) or has a relatively low water content (e.g., less than 50%, less than 40%, less than 35%, less than 30%, less than 25%, less than 20%, less than 15%, or less than 10% water by mass). Without wishing to be bound by theory, the use of non water-containing or low water content solvents has been found to cause the resulting plant extract compositions, when solidified (e.g., after removal of the solvent from the composition), to be much more tractable (e.g., to be a solid powder rather than a sticky mass), and to have substantially reduced coloration. That is, even after subsequent purification steps, solidified plant extract compositions that were formed via depolymerization of cutin in a high-pH solvent containing a substantial amount of water (e.g., greater than 50% water by mass) were found to result in a sticky mass with a substantial amount of coloration, whereas extract compositions formed via cutin depolymerization in a non water-containing or low water content solvent were able to be purified into a yellow/orange to colorless free flowing powder. It has been found that agricultural coatings formed from plant extract compositions with low coloration and with the powdery consistency described above can be substantially undetectable to the human eye, without modifying the appearance of the agricultural product to which they are applied. On the other hand, coatings formed from extracts with higher levels of coloration and/or sticky cannot be deposited as uniformly and may cause the coated agricultural product to appear discolored and/or damaged.

The reasons for the substantial difference in color and consistency of the resulting solidified compositions when water-containing and non water-containing (or low water content) solvents are used for depolymerization are unclear. However, without wishing to be bound by theory, it is hypothesized that the steric bulk of the nucleophile dictates the species that are depolymerized, including trace components, and that an undesirable mix of depolymerized species and trace components resulting from depolymerization in water containing solvents gives rise to color and/or sticky consistency in the extract composition.

Next, the solution comprising the intermediate extract dissolved in the high pH solvent is acidified in order to cause the monomer and/or oligomer units to be protonated or rendered neutral (i.e., to generate the corresponding free fatty acids and/or fatty esters and to be in a state that enables them to subsequently form an agricultural coating). In cases where the intermediate extract is obtained from (metal) alkoxide-mediated depolymerization, the pH of the solvent and intermediate extract can be adjusted to be in the range of about 6.5 to 9.0. In cases where the intermediate extract is obtained from (metal) hydroxide-mediated depolymerization, the pH of the solvent and intermediate extract can be adjusted to be in the range of about 1.0 to 6.5. Alternatively, rather than depolymerizing in an alkalized solvent and subsequently acidifying, the cutin can be at least partially depolymerized under acidic conditions to obtain an intermediate extract including a plurality of fatty acid cutin monomers, oligomers, or mixtures thereof.

The intermediate extract is then precipitated and/or extracted and purified (such as by washing with one or more selective solvents) to obtain the plant extract such that the plant extract is substantially free from accompanying plant-derived compounds (e.g., proteins, polysaccharides, phenols, lignans, aromatic acids, terpenoids, flavonoids, carotenoids, alkaloids, alcohols, alkanes, and aldehydes). Further purification by chromatography or recrystallization in selective solvent may also be carried out after washing to obtain the final extract.

In some embodiments, after depolymerization in the high pH solvent to obtain the intermediate extract, instead of directly acidifying the high pH solvent and the dissolved intermediate extract, the intermediate extract is first precipitated (i.e., solidified), for example by evaporating at least a portion (and in some cases substantially all of) the high pH solvent. The solidified intermediate extract is then dissolve in a polar solvent such as water in order to obtain a second solution, and the second solution is then acidified to a pH in the range of 1 to 6.5. Acidifying the second solution comprising the polar solvent and the intermediate extract may cause the intermediate extract to resolidify, after which the intermediate extract can be filtered out of the second solution. The resolidified intermediate extract can then be dissolved in another solvent, for example ethanol, to form the final plant extract composition. Alternatively, the resolidified intermediate extract can be selectively filtered to remove additional impurities and thereby obtain a second intermediate extract having a higher purity than the intermediate extract. For example, the second intermediate extract can be obtained by washing the intermediate extract in acetonitrile, as previously described. Finally, the second intermediate extract can be dissolved in another solvent, for example ethanol, to form the final plant extract composition.

In still other embodiments, after depolymerization in the high pH solvent to obtain the intermediate extract, instead of directly acidifying the high pH solvent and the dissolved intermediate extract, at least 25% of the high pH solvent is first evaporated, a polar solvent such as water is then added to form a second solution, and the second solution is then acidified to a pH in the range of 1 to 6.5. Acidifying the second solution comprising the polar solvent and the intermediate extract may cause the intermediate extract to precipitate (i.e., solidify), after which the intermediate extract can be filtered out of the second solution. The solidified intermediate extract can then be dissolved in another solvent, for example ethanol, to form the final plant extract composition. Alternatively, the solidified intermediate extract can be selectively filtered to remove additional impurities and thereby obtain a second intermediate extract having a higher purity than the intermediate extract. For example, the second intermediate extract can be obtained by washing the intermediate extract in acetonitrile, as previously described. Finally, the second intermediate extract can be dissolved in another solvent, for example ethanol, to form the final plant extract composition.

As used herein, "plant matter" refers to any portion of a plant that contains cutin including, for example, fruits (in the botanical sense, including fruit peels and juice sacs), leaves, stems, barks, seeds, flowers, or any other portion of the plant.

As used herein, the terms "about" and "approximately" generally mean plus or minus 10% of the value stated. For example, "about 250 µm" would include 225 µm to 275 µm, and "about 1,000 µm" would include 900 µm to 1,100 µm.

FIG. 1 shows a schematic flow diagram of a method 100 for preparing a plant extract composition. The method 100 includes thermally treating a plant matter to at least partially separate a cutin-containing portion from the plant matter, at 102. The thermal treating can include, for example, heating the plant matter (e.g., with steam, in water or in another solvent), freezing the plant, or subjecting the plant matter to cyclic thermal treatments. The plant matter can include any suitable plant matter or otherwise agricultural product such as, for example, fruits (including fruit peels and juice sacs), leaves, stem, barks, seeds, and flowers. In some embodiments, the plant matter can include agricultural waste products such as, for example, tomato peel, grape skins, apple peel, pepper peel, lemon peel, lemon leaf, lime peel, lime leaf, orange peel, orange leaf, orange fruit, clementine leaf, clementine fruit, mandarin leaf, mandarin fruit, pea seeds, grapefruit peel, grapefruit leaf, grapefruit seed, papaya peel, cherry fruits, cranberry skins, coffee cherries, grass clippings, or any other plants or portions of plants that can yield any embodiment of the plant extract compositions described herein. In some embodiments, the plant matter can be a fruit (e.g., a tomato, cranberry, or grape) and the cutin-containing portion can be a peel of the fruit (e.g., a tomato peel or cranberry skin or grape skin) such that the boiling can at least partially separate the peel from the fruit. The fruit can be washed to remove surface residue, waxes, or otherwise debris before operation 102. Furthermore, the fruit can be cut into halves, quarters, or small pieces or ground to finer pieces and then boiled until the peels or otherwise skins are visibly separated from the fruit pulp.

The method 100 can optionally include mechanically processing the plant matter to at least partially separate the cutin-containing portion from the plant matter, at 104. The mechanical process can be performed before and/or after thermal treatment of the plant matter (i.e., 102) (e.g., boiling of the plant matter in water) to facilitate separation of the cutin-containing portion from the plant matter. Suitable mechanical processes can include, for example, centrifugation, (ultra)sonication, pressing, ball milling, grinding, etc. In some embodiments, mechanical separation can include separating a fruit peel from the fruit pulp. In some embodiments, mechanical removal of the pulp might not be performed and the fruit skins (e.g., waste fruit skins leftover after processing of the fruit) may be macerated, blended, cut, shredded, food processed, or otherwise subjected to some other mechanical treatment operation to physically breakdown the fruit skins into smaller or finer pieces. In some embodiments, a plurality of intermediate mechanical processes can be used to obtain the plant extract composition. For example, a mechanical step can be used to separate the cutin from the non-cutin-containing portion, as described herein, or be used to augment any other operation included in the method 100. Such mechanical processes can include any of the mechanical processes described herein such as, for example, centrifugation, sonication, (ultra)sonication, milling, grinding, filtration, etc.

The cutin-containing portion is then optionally heated in a mixture of ammonium oxalate and oxalic acid to separate the cutin from the non-cutin-containing portion, at 106. Optionally this process can also be achieved (or assisted) using enzymes capable of breaking down polysaccharides or pectin. For example, the cutin can include the cuticular layer of the plant matter. The heating in the ammonium oxalate and oxalic acid mixture disrupts the pectinaceous glue that attaches the cuticle to the underlying cells of the plant matter and helps release the cuticle. Furthermore, this step disrupts the pectinaceous glue that is found within primary cell walls and between plant cells (e.g., in the middle lamella that binds neighboring cells), aiding in the isolation of a cutin-containing portion. In this manner, the ammonium oxalate and oxalic acid solution can facilitate at least partial chemical detachment of remaining debris from the cutin-containing portion of the plant (e.g., removal of any remaining pulp from the fruit peel). The heating can be performed at any suitable temperature (e.g., 35 degrees Celsius, 50 degrees Celsius, 55 degrees Celsius, 60 degrees Celsius, 65 degrees Celsius, 70 degrees Celsius, 75 degrees Celsius, 80 degrees Celsius, 85 degrees Celsius, 90 degrees Celsius, 95 degrees Celsius, or 100 degrees Celsius, inclusive of all ranges and values therebetween and for any suitable time (this process can be accelerated if carried out under elevated pressure). For example, in some embodiments, the cutin-containing portion can be heated in the mixture of ammonium oxalate and oxalic acid at a temperature of about 75 degrees Celsius for about 24 hours. In some embodiments, the portion of the plant, for example, the fruit peel, after treatment with the ammonium oxalate and oxalic acid solution, can be isolated by filtration and dried (e.g., air-dried under ambient conditions, oven-dried or freeze-dried) to remove any residual water.

In some embodiments, the cutin can optionally be treated with an enzyme, at 108. For example, the cutin can be treated with an enzyme such as a carbohydrate-hydrolyzing enzyme to digest or otherwise remove carbohydrates (e.g., cellulose or pectin) attached to or embedded within the cutin. Such enzymes can include, for example, naturally derived or synthetic cellulases, pectinases, and hemicellulases. The enzymatic degradation can be used before, after, or otherwise in place of operation 106 to obtain the cutin from the non-cutin-containing portion. In some embodiments, the reverse process may be employed wherein the cutin can be treated with an enzyme that can at least partially depolymerize the cutin to yield cutin oligomers or any combination of cutin oligomers and cutin monomers to leave behind the non-cutin-containing components, which could be filtered out or otherwise separated. Such enzymes can include, for example, cutinases, esterases, or lipases.

Optionally, the cutin is refluxed in at least one suitable solvent (e.g., chloroform and/or methanol) to remove soluble waxes or polar impurities from the cutin, at 110. For example, the cutin can be refluxed only in chloroform, refluxed in chloroform followed by refluxing in methanol, refluxed only in methanol, or refluxed in a mixture of chloroform and methanol, or any other suitable solvent(s) (or combinations thereof) in which the wax and/or polar components are soluble. In some embodiments, the cutin can be refluxed in a dilute solution of a strong base (e.g., potassium hydroxide in water or in alcoholic solvent), or a solution of a moderately strong or weak base (e.g., potassium carbonate in water or in alcoholic solvent) to remove soluble pigmented impurities. Alternatively, removal of residual waxes and remaining soluble components can be achieved using supercritical $CO_2$ or supercritical $H_2O$. The refluxing can be performed at any suitable temperature and for any suitable length of time. For example, in some embodiments, the cutin can be refluxed in chloroform at about 60-65 degrees Celsius for about 24-36 hours to remove any wax and/or non-polar compounds embedded in the cutin. This can be followed by refluxing in methanol at 65-70 degrees Celsius for about 4-12 hours, for example, to remove any polar organic components (e.g., flavonoids and flavonoid glycosides) present in the cutin. The completion of the operation can be determined by the clarity of solvents. For example, the process can be monitored with instrumentation (e.g., NMR, GC-MS, React-IR, FTIR, spectrophotometry, etc.) configured to analyze the clarity of the solvents and can continue until a predetermined clarity is achieved. Each of the chloroform and/or methanol extraction processes can be performed in any apparatus capable of refluxing (i.e., recirculating and/or recycling) the solvents such as, for example, a reaction flask equipped with a condenser, a Soxhlet apparatus, a Kumagawa extractor, an ultrasound assisted extractor, a robot automated extractor, or any other suitable extraction apparatus. Such an apparatus can, for example, reduce the amount of solvent used in the extraction process. Any other solvent or combinations thereof (i.e., a binary or ternary mixture) can be used to wash out undesired impurities. Suitable solvents can include, for example, diethyl ether, dichloromethane, hexane, petroleum ether, ethyl acetate, acetone, isopropanol, ethanol, acetonitrile, supercritical carbon dioxide, supercritical water, water, and mixtures thereof. In some embodiments, multiple extraction steps in one or more solvents can also be performed. In some embodiments, intermediate enzymatic treatment steps can also be performed between the solvent extraction processes, for example, to liberate undesired compounds from the cutin. The solution obtained after operation 110 can include a relatively pure sample of the cutin included in the portion of the plant along with any residually attached or embedded polysaccharides (e.g., cellulose), plant metabolites (e.g., flavonoids), and/or proteins.

The cutin is then heated in a solution of metal alkoxide or metal hydroxide to at least partially depolymerize the cutin and obtain an intermediate extract including a plurality of monomeric and/or oligomeric fatty cutin esters and/or acids (or combinations thereof), at 112. The metal alkoxide can include, for example, sodium methoxide, sodium ethoxide, sodium iso-propoxide, sodium n-propoxide, sodium iso-butoxide, sodium n-butoxide, potassium methoxide, potassium ethoxide, potassium iso-propoxide, potassium n-propoxide, potassium iso-butoxide, or potassium n-butoxide. The metal hydroxide can include, for example, Group I or Group II metal hydroxides, such as lithium, sodium, potassium, calcium, rubidium, or cesium hydroxide. Also included are precursors or compounds that will generate alkoxide or hydroxide in a suitable reaction medium (such as neat metals (e.g., sodium metal) or oxides in methanol, or ammonia in water). Refluxing of the cutin in the presence of the metal alkoxide or metal hydroxide can be performed at any suitable temperature and for any suitable length of time such as, for example, at about 65 degrees Celsius for about 24 hours. In some embodiments, refluxing of the cutin in the presence of the metal alkoxide to obtain fatty esters (or oligomers thereof) can be carried out in anhydrous reagents, anhydrous solvents, a closed atmosphere, and/or a nitrogenous atmosphere in order to favor ester formation over saponification and acid formation. In some embodiments, the temperature and/or the refluxing time can be such that the cutin is only partially depolymerized to yield a predetermined combination of oligomers and monomers. In some embodiments, the temperature and/or the refluxing time can be adjusted such that the cutin is mostly depolymerized by the metal alkoxide or metal hydroxide into a plurality of monomeric cutin-derived fatty esters or fatty acids, respectively. In some embodiments, the refluxing in the metal alkoxide or metal hydroxide can be performed in a mixture of the metal alkoxide or metal hydroxide and a solvent, for example, methanol, ethanol, hexane, toluene, etc. In the case of cutin depolymerization with metal hydroxide, water can also be used as a solvent to obtain cutin-derived fatty acids. In some embodiments, the solvent can include methanol. The concentration of metal alkoxide, solvent, and/or the pH of the solution can, for example, facilitate the preservation of the depolymerized cutin components in monomeric ester or acid form, which can prevent oligomerization or repolymerization of the liberated cutin monomers included in the intermediate extract. In some embodiments, the depolymerization and transesterification of the cutin to obtain esterified cutin monomers can be performed by refluxing in a solution of methanol containing boron trifluoride and/or a metal alkoxide (e.g., sodium methoxide).

In some embodiments, after depolymerization, any undepolymerized solids can be removed from the reaction mixture by, for example, filtration or centrifugation. The filtrate containing solubilized cutin monomers is then subjected to pH adjustment. The pH of the intermediate extract obtained after depolymerization with metal alkoxide is adjusted to be in the range of about 6.5 to 9.0 at 114, inclusive of all ranges and values therebetween. In some embodiments, the pH of the intermediate extract obtained after depolymerization with metal hydroxide is adjusted to be in the range of about 1.0 to about 6.5, at 114. In some embodiments, the pH adjustment can be directly carried out in the depolymerization reaction medium (e.g., methanolic KOH). Optionally, the reaction solvent can be removed, for example, by evaporation to obtain a crude, concentrated extract that can then be reconstituted in a solvent different from the depolymerization reaction (e.g., evaporation of methanol and reconstitution with water) prior to pH adjustment. For example, the pH can be adjusted to be in the range of 1.5 to about 6.5, about 2 to about 6.5, about 2.5 to about 6.5, about 3 to about 6.5, about 3.5 to about 6.5, about 4 to about 6.5, about 4.5 to about 6.5, about 5 to about 6.5, or about 5.5 to about 6.5, inclusive of all ranges and values therebetween. The adjusting of the pH can be performed using any suitable acid such as, for example, citric acid, acetic acid, hydrochloric acid, sulfuric acid, phosphoric acid, hydrobromic acid, ascorbic acid, tartaric acid, formic acid, gluconic acid, lactic acid, oxalic acid, boric acid, any other suitable acid, any other suitable pH adjusting agent, or a combination thereof. In some embodiments, the adjusting of the pH can be sufficient to protonate a secondary and/or a primary hydroxyl group of the plurality of esterified cutin monomers, but insufficient to protonate a carboxylate group present as a result of depolymerization at alkaline pHs. For example, in some embodiments, the liberated cutin monomers can include esters of a fatty acid, a hydroxy fatty acid, a dihydroxy fatty acid, and/or a trihydroxy fatty acid. In some embodiments, the liberated cutin monomers can include a fatty acid, a hydroxy fatty acid, a dihydroxy fatty acid, and/or a trihydroxy fatty acid. In some embodiments, the liberated cutin monomers can include the salts of a fatty acid, a hydroxy fatty acid, a dihydroxy fatty acid, and/or a trihydroxy fatty acid. Upon lowering the pH of the intermediate extract that includes one or more of these hydroxy fatty esters or acids, the secondary hydroxyl groups are protonated first (included in dihydroxy fatty acids and trihydroxy fatty acids), followed by the primary hydroxyl groups (included in trihydroxy fatty acids, dihydroxy fatty acids, and monohydroxy fatty acids). Any further lowering of the pH of the intermediate extract obtained from hydroxide-mediated cutin depolymerization can also protonate the carboxylate group of the obtained cutin monomers, which will modify solubility of the monomers in a polar reaction medium. Therefore, the pH can be adjusted such that the degree of protonation can be controlled so as to tune downstream methods of monomer isolation. For example, in some embodiments, the pH of a solution of the intermediate extract can be adjusted so as to preferentially promote precipitation of the fatty acid cutin monomers (and oligomers) from the solution and facilitate recovery of the monomers (and oligomers) by, for example, filtration or centrifugation. In this example, the pH of a solution of the intermediate extract in water can be adjusted to be about pH 1-3 such that fatty cutin monomers (and oligomers) precipitate from the solution and the solids can be recovered by filtration or centrifugation.

The intermediate extract is resolidified at 116. The resolidification can include, for example, precipitation of the cutin-derived fatty esters or fatty acids from the solution by evaporation of the solvent(s) or addition of an agent that induces precipitation (such as salts, acids, unfavorable solvents, or co-precipitation agents).

Optionally, the crude extract can be purified by washing of the precipitated extract with a selective solvent (e.g., acetonitrile) or combinations of selective solvents, at 118, and/or recrystallization of the extracted cutin monomers, at 120, and/or chromatographic separation and isolation of the cutin monomers, at 122.

In some embodiments, the crude extract is refluxed in at least one suitable solvent or (e.g., acetonitrile, acetone, etc.) or combinations thereof to remove oligomeric, phenolic, and colored impurities, at 118. Alternatively, removal of oligomeric, phenolic, and colored impurities can be achieved using supercritical $CO_2$ or supercritical $H_2O$. The refluxing can be performed at any suitable temperature and for any suitable length of time. For example, in some embodiments, the crude extract can be refluxed in acetonitrile at about 80-85 degrees Celsius for about 24-36 hours to solubilize monomeric components, leaving behind a partly soluble and/or insoluble residue of oligomeric, phenolic, and colored impurities. The completion of the operation can be determined by the clarity of the monomer-enriched solution. For example, the process can be monitored with instrumentation (e.g., NMR, GC-MS, React-IR, FTIR, spectrophotometry, etc.) configured to analyze the clarity of the solvents and can continue until a predetermined clarity is achieved. The post-depolymerization extraction processes can be performed in any apparatus capable of refluxing (i.e., recirculating and/or recycling) the solvents such as, for example, a Soxhlet apparatus, a Kumagawa extractor, an ultrasound assisted extractor, a robot automated extractor, or any other suitable extraction apparatus. Such an apparatus can, for example, reduce the amount of solvent used in the extraction process. Any other solvent or combinations thereof (i.e., a binary or ternary mixture) can be used to wash out undesired impurities. Suitable solvents can include, for example, diethyl ether, dichloromethane, hexane, petroleum ether, ethyl acetate, acetone, isopropanol, ethanol, acetonitrile, supercritical carbon dioxide, supercritical water, water, and mixtures thereof. In some embodiments, multiple extraction steps in one or more solvents can also be performed. In some embodiments, intermediate enzymatic treatment steps can also be performed between the solvent extraction processes, for example, to liberate undesired compounds from the crude extract. The resulting solution can be resolidified. The resolidification can include, for example, precipitation of the cutin-derived fatty esters or fatty acids from the solution by evaporation of the solvent(s) or addition of an agent that induces precipitation (such as salts, unfavorable solvents, or co-precipitation agents). The plant extract obtained using the method 100 can be substantially free of accompanying plant-derived compounds (e.g., proteins, polysaccharides, phenols, lignans, aromatic acids, terpenoids, flavonoids, carotenoids, alkaloids, alcohols, alkanes, and aldehydes).

In some embodiments, the plant extract composition obtained using the method 100 or any other method described herein, can include any suitable combination of cutin monomers including, for example, $C_{16}$-ω-hydroxy fatty acids, and/or $C_{16}$ hydroxy fatty acids, and/or $C_{16}$ dihydroxy fatty acids, and/or $C_{16}$ trihydroxy fatty acids, and/or $C_{16}$-ω-hydroxy-oxo fatty acids, and/or $C_{18}$-ω-hydroxy fatty acids, and/or $C_{18}$ hydroxy fatty acids, and/or $C_{18}$ dihydroxy fatty acids, and/or $C_{18}$ trihydroxy fatty acids, and/or $C_{18}$-ω-hydroxy-oxo fatty acids, and/or $C_{18}$-ω-hydroxy-epoxy fatty acids, and residual fatty acids, and/or esters of said families of $C_{16}$ hydroxy fatty acids and/or $C_{18}$ hydroxy fatty acids and residual fatty acids. For example, in some embodiments, the plant extract composition can include a first fraction including $C_{16}$ hydroxy fatty acids or $C_{16}$ hydroxy fatty esters in the range of about 15 wt % to about 100 wt %, a second fraction including $C_{18}$ hydroxy fatty acids or $C_{18}$ hydroxy fatty esters in the range of 0 wt % to about 90 wt %, and a third fraction including residual fatty acids or residual fatty esters in the range of about 0 wt % to about 75 wt %. In some embodiments, the plant extract composition can include a first fraction including $C_{16}$ hydroxy fatty acids or $C_{16}$ hydroxy fatty esters in the range of about 50 wt % to about 100 wt %, a second fraction including $C_{18}$ hydroxy fatty acids or $C_{18}$ hydroxy fatty esters in the range of 0 wt % to about 35 wt %, and a third fraction including residual fatty acids or residual fatty esters in the range of about 0 wt % to about 23 wt %. In some embodiments, the combination and relative concentration of the $C_{16}$ hydroxy fatty acids (or $C_{16}$ hydroxy fatty esters), the $C_{18}$ hydroxy fatty acids (or $C_{18}$ hydroxy fatty esters), and the residual fatty acids (or residual fatty esters) can be controlled by adjusting the process parameters (e.g., depolymerization conditions, and choice of post-depolymerization extraction, resolidification, wash, and purification conditions) included in the method 100, or by blending the extracts from multiple plant sources. The $C_{16}$ hydroxy fatty acids can include, but are not limited to, at least one of 16-hydroxyhexadecanoic acid, 9(10),16-dihydroxyhexadecanoic acid, 9,10,16-trihydroxyhexadecanoic acid, and 16-hydroxy-10-oxohexadecanoic acid. The $C_{16}$ hydroxy fatty esters can include, but are not limited to, at least one of methyl 16-hydroxyhexadecanoate, methyl 9(10),16-dihydroxyhexadecanoate, methyl 9,10,16-trihydroxyhexadecanoate, and methyl 16-hydroxy-10-oxohexadecanoate. The $C_{18}$ hydroxy fatty acids can include at least one of 18-hydroxyoctadecanoic acid, 9(10),18-dihydroxyoctadecanoic acid, 9,10,18-trihydroxyoctadecanoic acid, and 18-hydroxy-9,10-epoxy-octadecanoic acid. The $C_{18}$ hydroxy fatty esters can include at least one of methyl 18-hydroxyoctadecanoate, methyl 9(10),18-dihydroxyoctadecanoate, methyl 9,10,18-trihydroxyoctadecanoate, and methyl 18-hydroxy-9,10-epoxy-octadecanoate.

For example, in some embodiments, the first fraction can include about 50 wt % to about 100 wt % of a 9(10),16-dihydroxyhexadecanoic acid (or the ester thereof), about 2 wt % to about 27 wt % of a 16-hydroxyhexadecanoic acid (or the ester thereof), and 0 wt % to about 35 wt % of a 16-hydroxy-10-oxohexadecanoic acid (or the ester thereof). In some embodiments, the second fraction can include at least 0 wt % to about 100 wt % of a 9,10,18-trihydroxyoctadecanoic acid (or the ester thereof). In some embodiments, the second fraction can also include 0 wt % to about 8 wt % of a 9,10,18-trihydroxyoctadecanoic acid (or the ester thereof), at least 0 wt % to about 9 wt % of a ω-hydroxyoctadecanoic acid (or the ester thereof), and/or at least 0 wt % to about 33 wt % of a ω-hydroxy-9,10-epoxy-octadecanoic acid (or the ester thereof). The residual fatty acids (and/or fatty esters) can include any other fatty acids (or fatty esters) excluding $C_{16}$ and $C_{18}$ hydroxy fatty acids (or fatty esters) in any proportion or combination such as, for example, hexadecanoic acid, dicarboxylic acids, 9,10-dihydroxyhexadecane-1,16-dioic acid, 9,12-octadecadienoic acid, trans-9-octadecenoic acid, cis-9-octadecenoic acid, octadecanoic acid, tetradecanoic acid, pentadecanoic acid, heptadecanoic acid, 22-hydroxydocosanoic acid, dihydroxyhexadecane, methyl-n,ω-dihydroxyoctadecanoate, coumaric acid, ferulic acid, other $C_{16}$ or $C_{18}$ fatty acids, esters thereof, or any other <$C_{18}$ fatty acid (or esters thereof) included in a portion of a plant from which the plant extract composition is prepared. Furthermore, the plant extract compositions described herein can be substantially free from accompanying plant-derived compounds (e.g., proteins, polysaccharides, phenols, lignans, aromatic acids, terpenoids, flavonoids, carotenoids, alkaloids, alcohols, alkanes, and aldehydes).

The relative concentrations of the various cutin monomers in the extract can be dependent on the source plant matter or otherwise agricultural product used to prepare the plant extract. In some embodiments, a plant or a portion of a plant can be selected such that the composition of the cutin monomers forming the cuticular layer in the portion of the plant yields the plant extract compositions described herein. In some embodiments, the plant matter can include agricultural waste products such as, for example, tomato peel, grape skins, apple peel, pepper peel, lemon peel, lemon leaf, lime peel, lime leaf, orange peel, orange leaf, orange fruit, clementine leaf, clementine fruit, mandarin leaf, mandarin fruit, pea seeds, grapefruit peel, grapefruit leaf, grapefruit seed, *papaya* peel, cherry fruits, cranberry skins, coffee cherries, grass clippings, or any other plants or portions of plants that can yield any embodiment of the plant extract compositions described herein. For example, in some embodiments, the plant extract can be a tomato peel extract. In such embodiments, the tomato peel extract can include, for example, about 65 wt % to about 85 wt % of a 9(10),16-dihydroxyhexadecanoic acid (or the ester thereof), about 3 wt % to about 7 wt % of a 16-hydroxyhexadecanoic acid (or the ester thereof), about 1 wt % to about 4 wt % of a 9,10,18-trihydroxyoctadecanoic acid (or the ester thereof), and about 20 wt % to about 25 wt % residual fatty acids (or the esters thereof). For example, the tomato peel extract composition can include about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, or about 84 wt % of the 9(10),16-dihydroxyhexadecanoic acid (or the ester thereof), inclusive of all ranges therebetween. Moreover, the tomato peel extract composition can include about 4 wt %, about 5 wt %, or about 6 wt % of the 16-hydroxyhexadecanoic acid (or the ester thereof), inclusive of all ranges therebetween. The 9,10,18-trihydroxyoctadecanoic acid (or the ester thereof) can be about 2 wt %, or about 3 wt %, inclusive of all ranges therebetween, and the residual fatty acids (or the esters thereof) can be about 21 wt %, about 22 wt %, about 23 wt %, or about 24 wt %, inclusive of all ranges therebetween.

In some embodiments, the plant or portion of the plant selected for obtaining the plant extract composition can naturally include higher proportions of the $C_{16}$ and/or $C_{18}$ hydroxy fatty acids (or the esters thereof). For example, the portions of the plant selected for obtaining the plant extract compositions described herein can include a higher proportion of the 9(10),16-dihydroxyhexadecanoic acid (or the ester thereof) such that the plant extract composition obtained from the portion of the plant has a concentration of the 9(10),16-dihydroxyhexadecanoic acid (or the ester thereof) as described herein (e.g., about 50 wt % to about 100 wt % of the first fraction, i.e., the $C_{16}$ hydroxy fatty acid (or the ester thereof) fraction). In some embodiments, various combinations of different plant species and/or portions of plants (i.e., plant organs) can be selected to adjust the relative concentrations of the $C_{16}$ and/or $C_{18}$ hydroxy fatty acids (or the esters thereof) obtained in the plant extract compositions described herein. Dihydroxy fatty acids (e.g., 9(10),16-dihydroxyhexadecanoic acid) (or the esters thereof) and trihydroxy fatty acids (e.g., 9,10,18-trihydroxyoctadecanoic acid) (or the esters thereof) can form tightly bound networks with high crosslink density and low permeability relative to monohydroxy fatty acids (or the esters thereof). Thus, the plant extract compositions described herein can include a relative proportion of the dihydroxy fatty acids (or the esters thereof) and the trihydroxy fatty acids (or the esters thereof), which can allow the plant extract compositions to be used in agricultural coating formulations. Such coatings can be used for coating various portions of the plants such as, for example, plant stems, shoots, flowers, fruits, leaves, seeds, roots, etc., and preventing moisture loss, oxygen diffusion (which leads to oxidation), biotic stressors, surface scratching or damage, etc. Such coatings can also be used to delay ripening. Since the plant extract compositions are obtained from natural sources, the plant extract compositions can be safe for human consumption. Furthermore, the plant extract compositions can be biodegradable.

In some embodiments, a method of protecting a portion of a plant from environmental and biotic stressors can include coating the portion of the plant with a coating including a plant extract composition. The plant extract composition can include at least about 50 wt % to about 100 wt % of $C_{16}$ hydroxy fatty acids (and/or esters thereof), at least 0 wt % to about 35 wt % of $C_{18}$ hydroxy fatty acids (and/or esters thereof), and at least about 0 wt % to about 23 wt % of residual fatty acids (and/or esters thereof). The plant extract can be substantially free of accompanying plant-derived compounds (e.g., proteins, polysaccharides, phenols, lignans, aromatic acids, terpenoids, flavonoids, carotenoids, alkaloids, alcohols, alkanes, and aldehydes). In some embodiments, the $C_{16}$ hydroxy fatty acids (or esters thereof) can include about 50 wt % to about 100 wt % of a 9(10),16-dihydroxyhexadecanoic acid (or an ester thereof), about 2 wt % to about 27 wt % of a 16-hydroxyhexadecanoic acid (or an ester thereof), and 0 wt % to about 35 wt % of a 16-hydroxy-10-oxohexadecanoic acid (or an ester thereof). In some embodiments, the $C_{18}$ hydroxy fatty acids (or esters thereof) can include 0 wt % to about 100 wt % of a 9,10,18-trihydroxyoctadecanoic acid (or an ester thereof), 0 wt % to about 8 wt % of a 9(10),18-dihydroxyoctadecanoic acid (or an ester thereof), 0 wt % to about 9 wt % of a w-hydroxyoctadecanoic acid (or an ester thereof), and/or 0 wt % to about 33 wt % of a w-hydroxy-9,10-epoxy-octadecanoic acid (or an ester thereof). In some embodiments, the residual fatty acids (and/or fatty esters) can include for example, hexadecanoic acid, dicarboxylic acids, 9,10-dihydroxyhexadecane-1,16-dioic acid, 9,12-octadecadienoic acid, trans-9-octadecenoic acid, cis-9-octadecenoic acid, octadecanoic acid, tetradecanoic acid, pentadecanoic acid, heptadecanoic acid, 22-hydroxydocosanoic acid, dihydroxyhexadecane, methyl-n,ω-dihydroxyoctadecanoate, coumaric acid, ferulic acid, other $C_{16}$ or $C_{18}$ fatty acids, esters thereof, or any other <$C_{18}$ fatty acid (or esters thereof). The plant extract composition included in the coating can be extracted from a suitable plant or portion of a plant such as, for example, tomato skin, grape skin, lemon peel, lemon leaf, lime peel, lime leaf, orange peel, orange leaf, orange fruit, clementine leaf, clementine fruit, pea seed, grapefruit leaf, cranberry skins, and cherry fruit. Furthermore, the plant extract composition included in the coating can be extracted using method 100 or any methods described herein.

In some embodiments, the cutin-derived monomers and/or oligomers resulting from the depolymerization of cutin are functionalized (e.g., modified, such as by conversion of the carboxylic acid to an ester or alcohol) prior to being applied to the surface of an agricultural product to form a protective coating. Functionalizing the monomers and/or oligomers can in some cases impart desirable properties such as modified solubility or hydrophobicity, which can result in improved properties of the subsequently formed protective coatings. Fatty acids can be converted to esters by several chemical transformations, for example via Fischer esterification with an alcohol and a catalytic amount of acid (e.g. methanol, ethanol, butanol, etc.) to form the corresponding ester (methyl ester, ethyl ester, butyl ester). For example, 9(10),16-dihydroxyhexadecanoic acid from tomato skins can be converted to ethyl 9(10),16-dihydroxyhexadecanoate by adding excess ethanol and a catalytic amount of acid. As another example, 9(10),16-dihydroxyhexadecanoic acid from tomato skins can be converted to methyl 9(10),16-dihydroxyhexadecanoate by adding excess methanol and a catalytic amount of acid. Alternatively, fatty acids could be converted to alcohols by using a reduction agent such as $LiAlH_4$. For example, 9(10),16-dihydroxyhexadecanoic acid from tomato skins can be converted to hexadecane-1,7(8),16-triol with $LiAlH_4$.

Functionalization of Compounds

In some embodiments, functionalizing the cutin-derived monomers and/or oligomers includes carrying out one or more of the following reactions:

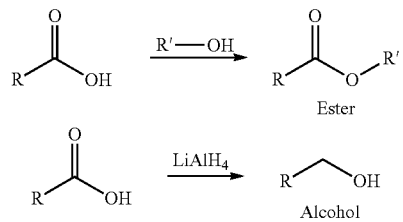

Ester

Alcohol where R represents the fatty acid radical.

In some embodiments, the monomers and/or oligomers can be glycerated to form monoacylglyceride (e.g., 1-monoacylglyceride and/or 2-monoacylglyceride) monomers and/or oligomers. For example, the monomers and/or oligomers can be functionalized or modified to one or more compounds of Formula I:

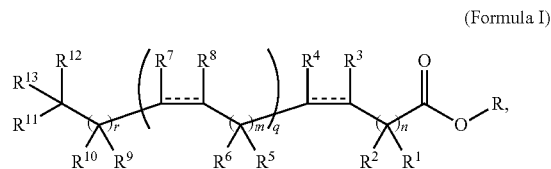

(Formula I)

wherein:

R is a 2-glyceryl optionally substituted with one or more $C_1$-$C_6$ alkyl or hydroxy;

$R^1$, $R^2$, $R^5$, $R^6$, $R^9$, $R^{10}$, $R^{11}$, $R^{12}$ and $R^{13}$ are each independently —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl, wherein each —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl is optionally substituted with —$OR^{14}$, —$NR^{14}R^{15}$, —$SR^{14}$, or halogen;

$R^3$, $R^4$, $R^7$ and $R^8$ are each independently —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl wherein each —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl is optionally substituted with —$OR^{14}$, —$NR^{14}R^{15}$, —$SR^{14}$, or halogen; or $R^3$ and $R^4$ can combine with the carbon atoms to which they are attached to form a 3 to 6-membered ring, such as a cyclic ether;

$R^7$ and $R^8$ can combine with the carbon atoms to which they are attached to form a 3 to 6-membered ring, such as a cyclic ether;

$R^{14}$ and $R^{15}$ are each independently —H, —$C_1$-$C_6$ alkyl, —$C_1$-$C_6$ alkenyl, or —$C_1$-$C_6$ alkynyl;

the symbol ===== represents an optionally single or cis or trans double bond;

n is an integer between 0 and 8;

m is an integer between 0 and 3;

q is an integer between 0 and 5; and r is an integer between 0 and 8.

In some implementations, the monomers and/or oligomers are modified to form compounds of Formula I and/or compounds of Formula II:

(Formula II)

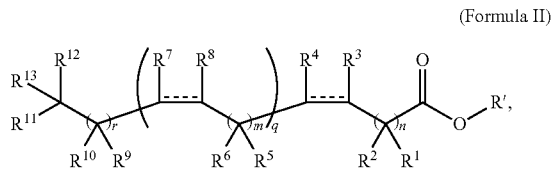

wherein:

R' is a 1-glyceryl optionally substituted with one or more $C_1$-$C_6$ alkyl or hydroxy;

$R^1$, $R^2$, $R^5$, $R^6$, $R^9$, $R^{10}$, $R^{11}$, $R^{12}$ and $R^{13}$ are each independently —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl, wherein each —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl is optionally substituted with —$OR^{14}$, —$NR^{14}R^{15}$, —$SR^{14}$, or halogen;

$R^3$, $R^4$, $R^7$ and $R^8$ are each independently —H, —$OR^{14}$, —$NR^{14}R^{15}$, —$SR^{14}$, halogen, —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl wherein each —$C_1$-$C_6$ alkyl, —$C_2$-$C_6$ alkenyl, —$C_2$-$C_6$ alkynyl, —$C_3$-$C_7$ cycloalkyl, —$C_6$-$C_{10}$ aryl, or 5 to 10-membered ring heteroaryl is optionally substituted with —$OR^{14}$, —$NR^{14}R^{15}$, —$SR^{14}$, or halogen; or $R^3$ and $R^4$ can combine with the carbon atoms to which they are attached to form a 3 to 6-membered ring, such as a cyclic ether;

$R^7$ and $R^8$ can combine with the carbon atoms to which they are attached to form a 3 to 6-membered ring, such as a cyclic ether;

$R^{14}$ and $R^{15}$ are each independently —H, —$C_1$-$C_6$ alkyl, —$C_1$-$C_6$ alkenyl, or —$C_1$-$C_6$ alkynyl;

the symbol ===== represents an optionally single or cis or trans double bond;

n is an integer between 0 and 8;

m is an integer between 0 and 3;

q is an integer between 0 and 5; and r is an integer between 0 and 8.

The modified/functionalized (e.g., esterized or glycerated) monomers and/or oligomers that make up the resulting plant extract composition can then be applied to the surface of an agricultural product to form a protective coating. As seen in FIGS. 2-6 and their associated descriptions below, protective coatings formed from compositions that comprise monoacylglycerides (e.g., compounds of Formula I and/or Formula II, as described above) have been found to reduce the rate of post-harvest mass loss in a variety of agricultural products, and in some cases to reduce the rate of post-harvest molding and/or spoilage.

The compounds of Formula I and/or Formula II may be prepared by methods known in the art of organic synthesis as set forth in part by the following synthetic schemes and examples. In the schemes described below, it is well understood that protecting groups for sensitive or reactive groups are employed where necessary in accordance with general principles or chemistry. Protective groups are manipulated according to standard methods of organic synthesis (T. W. Greene and P. G. M. Wuts, "Protective Groups in Organic Synthesis", Third edition, Wiley, New York 1999). These groups are removed at a convenient stage of the compound synthesis using methods that are readily apparent to those skilled in the art. The selection processes, as well as the reaction conditions and order of their execution, shall be consistent with the preparation of compounds of Formula I.

Those skilled in the art will recognize if a stereocenter exists in the compounds of Formula I and/or Formula II. Accordingly, the present disclosure includes both possible stereoisomers (unless specified in the synthesis) and includes not only racemic compounds but the individual enantiomers and/or diastereomers as well. When a compound is desired as a single enantiomer or diastereomer, it may be obtained by stereospecific synthesis or by resolution of the final product or any convenient intermediate. Resolution of the final product, an intermediate, or a starting material may be affected by any suitable method known in the art. See, for example, "Stereochemistry of Organic Compounds" by E. L. Eliel, S. H. Wilen, and L. N. Mander (Wiley-Interscience, 1994).

The compounds described herein may be made from commercially available starting materials or synthesized using known organic, inorganic, and/or enzymatic processes. In some embodiments, a compound of Formula I can be prepared from a corresponding acid or ester according to Scheme 1.

Scheme 1. Preparation of 2-glycero-10,16-dihydroxy Palmate from 10,16-dihydroxy Palmitic Acid

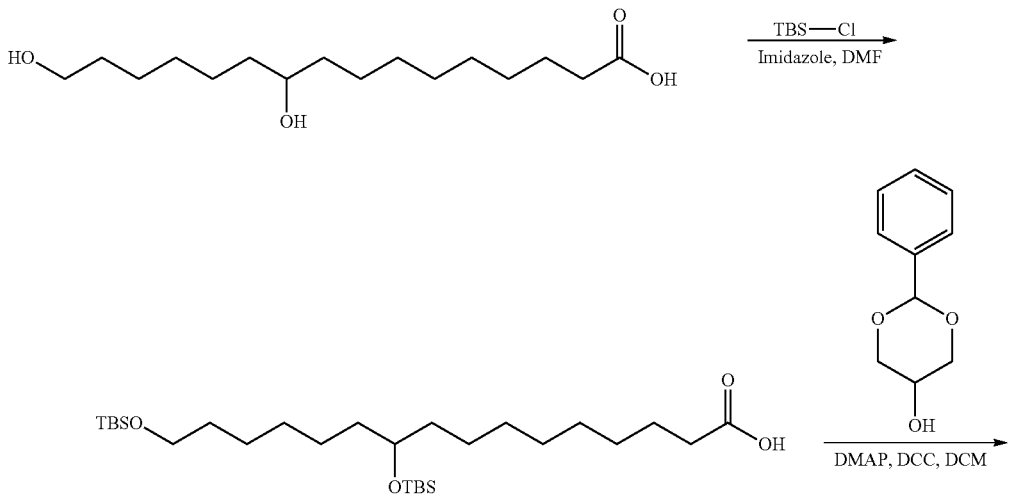

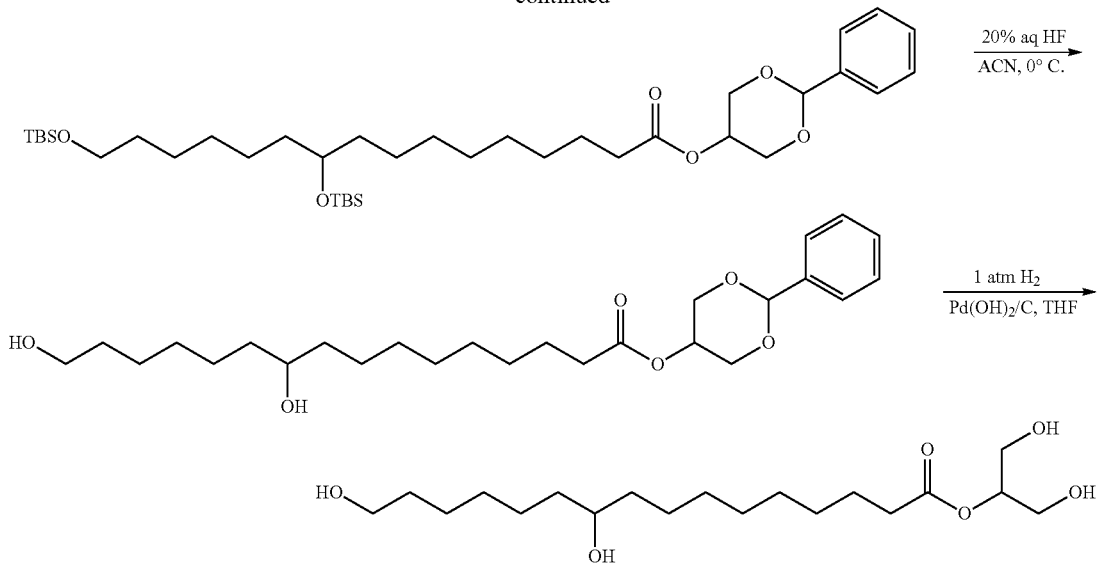

As shown in Scheme 1, compounds of Formula I can be prepared by protecting any hydroxy groups that may be present in the acid. As shown above in Scheme 1, hydroxy groups can be protected with a -TBS (tert-butyldimethylsilyl) protecting group. Esterification of the protected acid with an appropriately protected glycerol derivative (e.g., 2-phenyl-1, 3-dioxan-5-ol) can be accomplished with the aid of DMAP and DCC. Deprotection of the silyl protecting groups can be accomplished with an appropriate agent such as hydrofluoric acid. Finally, the glycerol group can be deprotected by, for instance, hydrogenation.

A skilled artisan will understand the chemical synthesis procedures set forth herein can be adjusted as necessary. For instance, other protecting groups can be used to protect, e.g., the alcohol groups as will be understood by one of skill in the art.

In some embodiments, the cutin-derived monomers, oligomers, and combinations thereof comprise fatty acids, and the converting step comprises esterifying the fatty acids. In some embodiments, the cutin-derived monomers, oligomers, and combinations thereof comprise esters, and the converting step comprises transesterifying the esters. In some embodiments, the cutin-derived monomers, oligomers, and combinations thereof comprise amides, and the converting step comprises transesterifying the amides. In some embodiments, the converting step comprises treating the cutin-derived monomers, oligomers, and combinations thereof with an appropriate alcohol and base or acid. In some embodiments, the base is sodium hydroxide, lithium hydroxide, potassium hydroxide, sodium carbonate, lithium carbonate, or potassium carbonate. In some embodiments, the acid is hydrochloric, sulfuric, or acetic acid.

In some embodiments, compounds of the present disclosure can be prepared by direct esterification using a suitable solvent, e.g., methanol. For instance, an appropriate fatty acid (e.g., 10,16-dihydroxyhexadecanoic acid) can be converted to a corresponding ester (e.g., methyl 10, 16-dihydroxyhexadecanoate) by treatment with an excess of a suitable solvent (e.g., methanol). In some embodiments, the esterification takes place in the presence of a suitable acid such as sulfuric acid. In some embodiments, the hydroxy groups on the fatty acid, if present are protected using a suitable protecting group (e.g., -TBS), whereas in some embodiments the hydroxy groups on the fatty acid are not protected.

FIGS. 2-6 illustrate the effects of coating a variety of agricultural products with plant extract compositions described herein. The coatings formed on the agricultural products shown in FIGS. 2, 3, 5, and 6 were each formed from compositions that included a mixture of 2-monoacylglyceride compounds (i.e., compounds of Formula I) and an additive that included 1-monoacylglyceride compounds (i.e., compounds of Formula II), wherein a mass ratio of the additive to the compound of Formula I was in a range of 0.1 to 1. To form the coatings, the solid mixtures of the compositions were first fully dissolved in ethanol at a concentration of 10 mg/mL to form a solution. The solution was then applied to the agricultural products either by spraying or dip coating, as detailed for each of the cases below. The agricultural products were then dried on drying racks under ambient conditions (temperature in the range of 23-27° C., relative humidity in the range of 40%-55%) until all of the solvent had evaporated, allowing the coatings to form over the substrates. The resultant coatings each had a thickness in the range of 0.1 μm to 1 μm.

Figure 2:
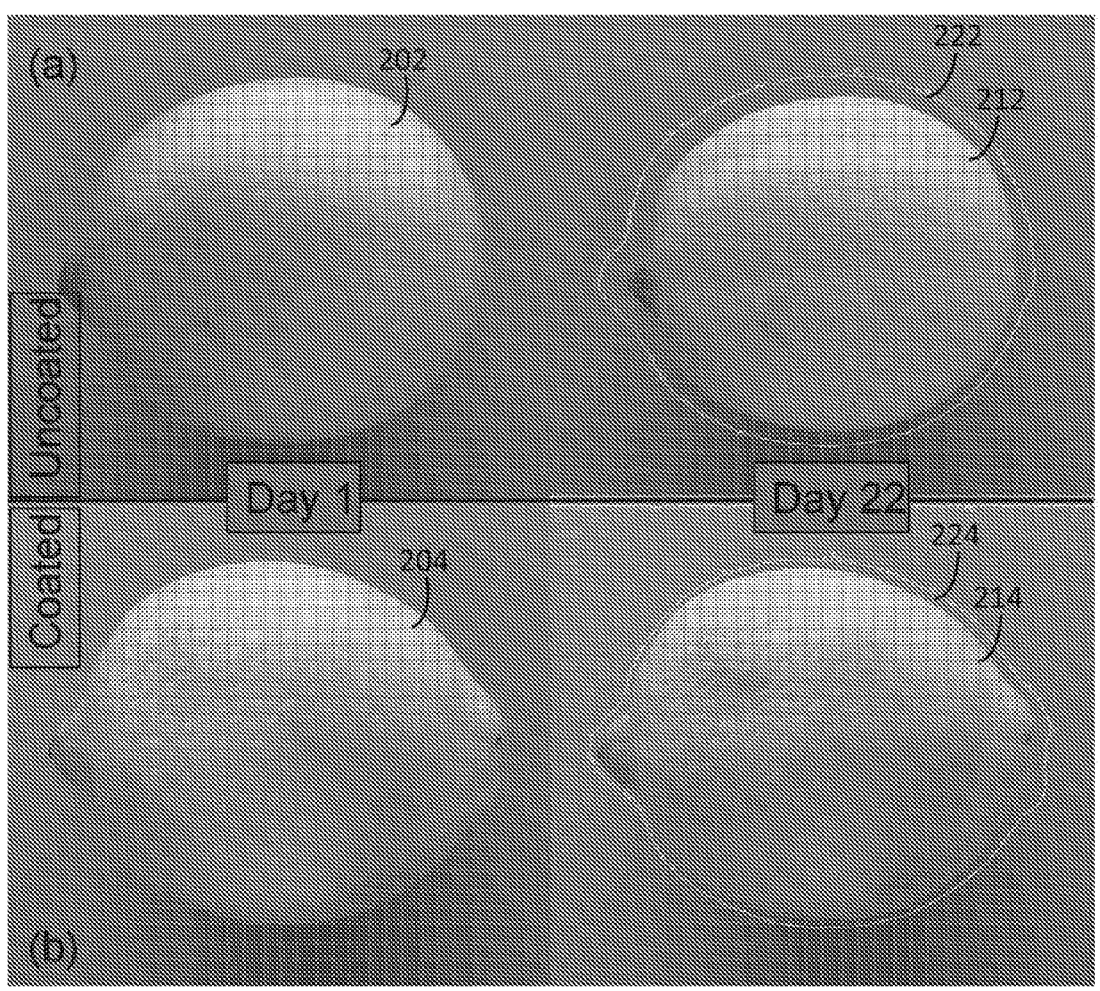
FIG. 2 shows high resolution time lapse photographs of lemons, both with and without coatings formed of compounds described herein.

FIG. 2 shows the effects of mass loss over time observed in lemons over the course of 3 weeks, both for uncoated lemons and for lemons that were coated with the compositions described above. In order to form the coatings, the lemons were placed in a bag, and the solution containing the composition was poured into the bag. The bag was then sealed and lightly agitated until the entire surface of each lemon was wet. The lemons were then removed from the bag and allowed to dry on drying racks under ambient room conditions at a temperature in the range of about 23-27° C. and relative humidity in the range of about 40-55%. The lemons were held at these same temperature and relative humidity conditions for the entire duration of the time they were tested. 202 is a high resolution photograph of an uncoated lemon immediately after being picked (Day 1), and 204 is a high resolution photograph of a lemon immediately after being picked and coated on the same day. 212 and 214 are photographs of the uncoated and coated lemons, respectively, taken on Day 22, 21 days after photographs 202 and 204. In order to better visualize the cross-sectional area loss (which is directly related to mass loss), an overlay 222 of the outline of the untreated lemon on Day 1 is shown around 212, and an overlay 224 of the outline of the untreated lemon on Day 1 is shown around 214. The coated lemons had a cross sectional area greater than 90% of their original area (e.g., greater than 92% of their original area), whereas the uncoated lemons had a cross sectional area less than 80% of their original area, thereby indicating reduced mass loss observed for coated lemons as compared to uncoated lemons stored under the same conditions.

Figure 3:
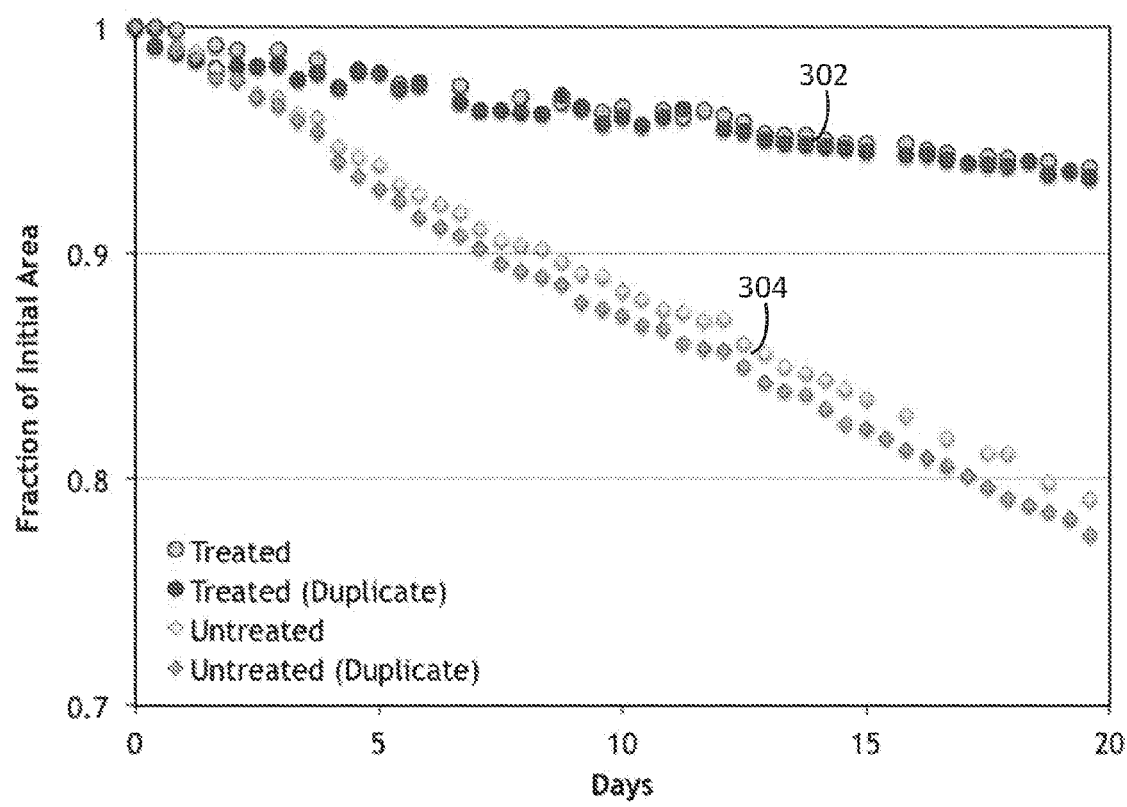
FIG. 3 is a normalized plot of the cross-sectional areas of the lemons coated with and without compounds described herein as a function of time.

FIG. 3 shows plots for both coated (302) and uncoated (304) lemons indicating the reduction in cross sectional area as a function of time over a period of 20 days. Specifically, on each day, high resolution images of each of the lemons were taken and analyzed with image processing software (as in FIG. 2) to determine the ratio of the cross sectional area on the particular day to the initial cross sectional area of the lemon. As seen in FIG. 3, after 20 days, the coated lemons had a cross sectional area greater than 90% of their original area (e.g., greater than 92% of their original area), whereas the uncoated lemons had a cross sectional area less than 80% of their original area, thereby indicating the reduced mass loss observed for coated lemons as compared to uncoated lemons stored under the same conditions.

Figure 4:
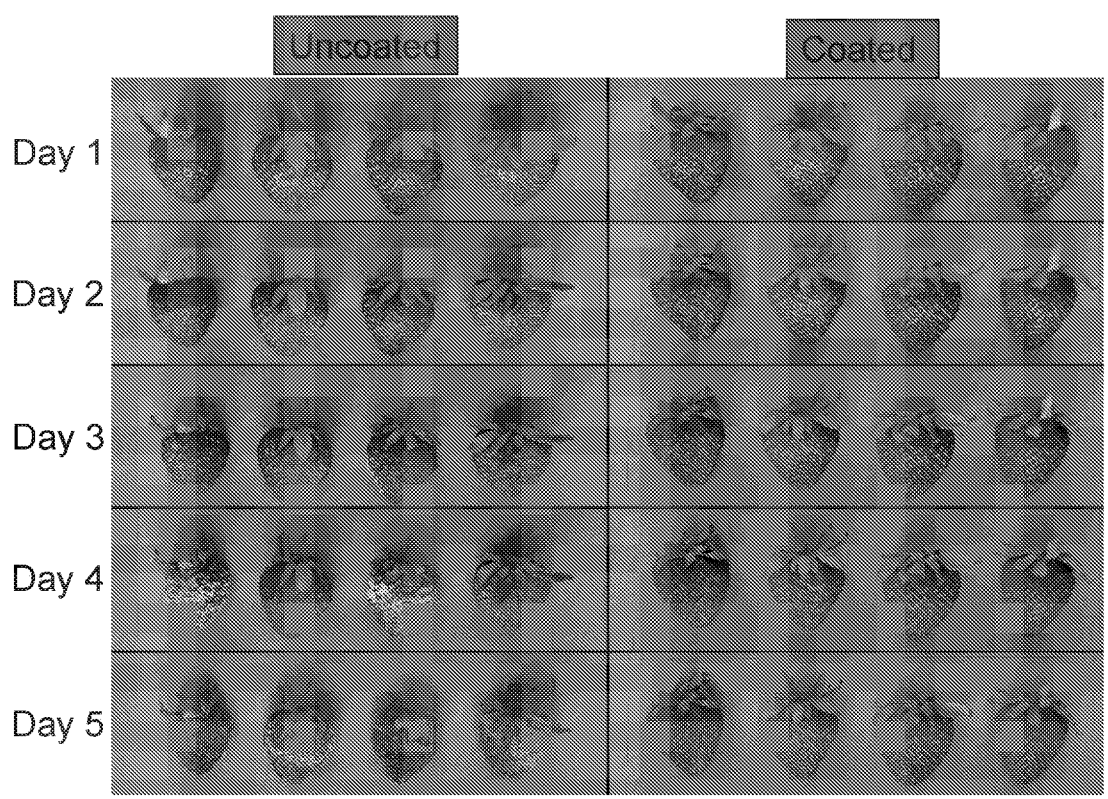
FIG. 4 shows high resolution time lapse photographs of strawberries, both with and without coatings formed of compounds described herein.

FIG. 4 shows high-resolution photographs of 4 coated and 4 uncoated strawberries over the course of 5 days. The coated strawberries were spray coated according to the following procedures. First, the strawberries were placed on drying racks. A solution containing the coating composition was placed in a spray bottle that generated a fine mist spray. The spray head was held approximately six inches from the strawberries, and the strawberries were sprayed and then allowed to dry on the drying racks. The strawberries were kept under ambient room conditions at a temperature in the range of about 23-27° C. and relative humidity in the range of about 40-55% while they dried and for the entire duration of the time they were tested. As seen, the uncoated strawberries began to exhibit fungal growth and discoloration by Day 3, and were mostly covered in fungus by Day 5. In contrast, the coated strawberries did not exhibit any visible fungal growth by Day 5 and were largely similar in overall color and appearance on Day 1 and Day 5, indicating a reduction in molding and spoilage for coated strawberries as compared to uncoated strawberries stored under the same conditions.

Figure 5:
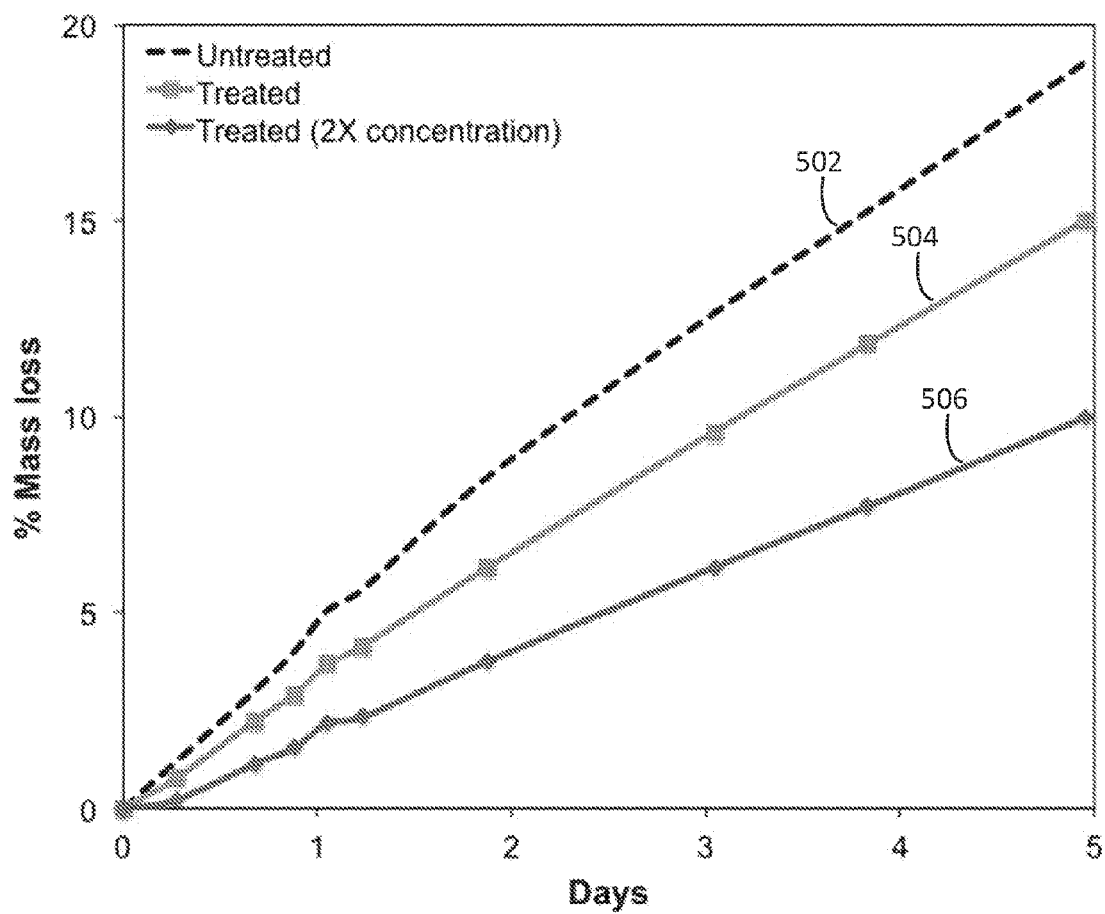
FIG. 5 is a plot of the percent mass loss of blueberries with and without coatings formed of the compounds described herein as a function of time.

FIG. 5 shows plots of the percent mass loss over the course of 5 days in uncoated blueberries (502), blueberries coated using a solution of 10 mg/mL of compounds dissolved in ethanol (504), and blueberries coated using a solution of 20 mg/mL of compounds dissolved in ethanol (506). To form the coatings over the blueberries, the following dip coating procedures were used. Each blueberry was gently picked up with a set of tweezers and individually dipped in the solution for approximately 1 second or less, after which the blueberry was placed on a drying rack and allowed to dry. The blueberries were kept under ambient room conditions at a temperature in the range of about 23-27° C. and relative humidity in the range of about 40-55% while they dried and for the entire duration of the time they were tested. Mass loss was measured by carefully weighing the blueberries each day, where the reported percent mass loss was equal to the ratio of mass reduction to initial mass. As shown, the percent mass loss for uncoated blueberries was almost 20% after 5 days, whereas the percent mass loss for blueberries coated with the 10 mg/mL solution was less than 15% after 5 days, and the percent mass loss for blueberries coated with the 20 mg/mL solution was less than 10% after 5 days, thereby indicating reduced mass loss observed for coated blueberries as compared to uncoated blueberries stored under the same conditions.

Figure 6:
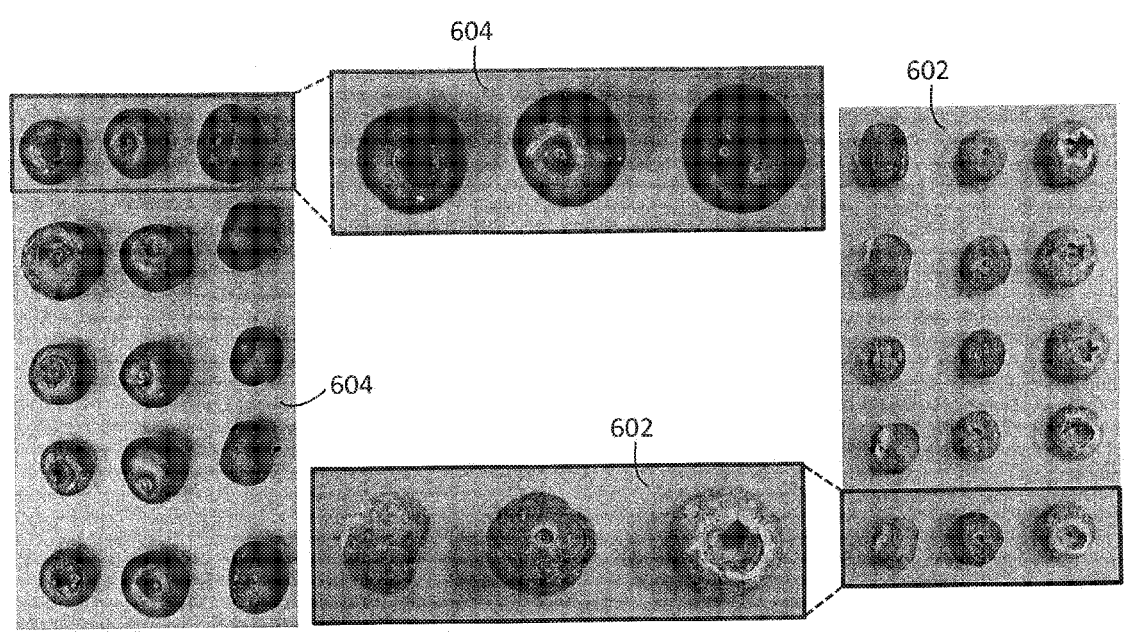
FIG. 6 shows high resolution photographs of blueberries, both with and without coatings formed of compounds described herein after five days.

FIG. 6 shows high-resolution photographs of the uncoated blueberries (602) and of the blueberries coated with the 10 mg/mL solution (604) at Day 5. The skins of the uncoated blueberries 602 were highly wrinkled as a result of mass loss of the blueberries, whereas the skins of the coated blueberries remained very smooth.

In some embodiments, the depolymerization of the cutin and/or forming of the plant extract composition is carried out by a first party, while the application of the plant extract composition to an agricultural product to form a protective coating over the agricultural product is carried out by a second party different from the first party. For example, a manufacturer of the plant extract compositions (i.e., a first party) can form the compositions by one or more of the methods described herein. The manufacturer can then sell or otherwise provide the resulting plant extract composition to a second party, for example a farmer, shipper, distributor, or retailer of produce, and the second party can apply the composition to one or more agricultural products to form a protective coating over the products. Alternatively, the manufacturer can sell or otherwise provide the resulting plant extract composition to an intermediary party, for example a wholesaler, who then sells or otherwise provides the plant extract composition to a second party such as a farmer, shipper, distributor, or retailer of produce, and the second party can apply the composition to one or more agricultural products to form a protective coating over the products.

In some cases where multiple parties are involved, the first party may optionally provide instructions or recommendations about the extract composition, either written or oral, indicating one or more of the following: (i) that the composition is intended to be applied to a product for the purpose of coating or protecting the product, to extend the life of the product, to reduce spoilage of the product, or to modify or improve the aesthetic appearance of the product; (ii) conditions and/or methods that are suitable for applying the compositions to the surfaces of products; and/or (iii) potential benefits (e.g., extended shelf life, reduced rate of mass loss, reduced rate of molding and/or spoilage, etc.) that can result from the application of the composition to a product. While the instructions or recommendations may be supplied by the first party directly with the plant extract composition (e.g., on packaging in which the composition is sold or distributed), the instructions or recommendations may alternatively be supplied separately, for example on a website owned or controlled by the first party, or in advertising or marketing material provided by or on behalf of the first party.

In view of the above, it is recognized that in some cases, a party that manufactures a plant extract composition according to one or more methods described herein (i.e., a first party) may not directly form a coating over a product from the extract composition, but can instead direct (e.g., can instruct or request) a second party to form a coating over a product from the extract composition. That is, even if the first party does not coat a product by the methods and compositions described herein, the first party may still cause the plant extract composition to be applied to the product to form a protective coating over the product by providing instructions or recommendations as described above. Accordingly, as used herein, the act of applying a plant extract composition to a product (e.g., a plant or agricultural product) also includes directing or instructing another party to apply the plant extract composition to the product, or causing the plant extract composition to be applied to the product.

In some embodiments, the plant extract composition can be applied directly to a portion of a plant. In some embodiments, the plant extract composition can be heated to modify the physical and/or chemical properties of the composition prior to and/or during and/or after the application process. In some embodiments, the plant extract composition can be dissolved and/or suspended in a solvent, in aqueous solutions, or in a carrier liquid to form the coating. The solvent can include any polar, non-polar, protic, or aprotic solvents, including any combinations thereof. Examples of solvents that can be used to dissolve the plant extract compositions described herein include water, methanol, ethanol, isopropanol, butanol, acetone, ethyl acetate, chloroform, acetonitrile, tetrahydrofuran, diethyl ether, methyl tert-butyl ether, any other suitable solvent or a combination thereof. Aqueous solutions of such plant extract compositions can be suitable for coating on agricultural products, for example, forming a coating on the agricultural product. In some embodiments, the coatings can be configured to change the surface energy of the agricultural product. Various properties of coatings described herein can be adjusted by tuning the crosslink density of the coating, its thickness, or its composition. This can, for example, be used to control the ripening of post-harvest fruit or produce. For example, plant extract composition coatings that primarily include bifunctional or polyfunctional cutin monomer units can, for example, have higher crosslink densities than those that include monofunctional or bifunctional cutin monomer units. Thus, the plant extract composition coatings that primarily include bifunctional or polyfunctional cutin monomer units can result in slower rates of ripening.

In some embodiments, an acid or a base can be added to the coating formulation to achieve a desired pH suitable for coating the plant extract composition coating on the agricultural product. In some embodiments, additives such as, for example, surfactants, emulsifiers, thickening agents, nonionic polymers, waxes, or salts can be included in the coating formulation. In some embodiments, weak acids, ions, or non-reactive molecules can be included in the coating formulation to control or adjust the properties of the resulting films or coatings. In some embodiments, pH stabilizers or modifiers can also be included in the coating formulation. In some embodiments, the coating formulation can include additional materials that are also transported to the surface with the coating, or are deposited separately and are subsequently encapsulated by the coating (i.e., the coating is formed at least partially around the additional material), or are deposited separately and are subsequently supported by the coating (i.e., the additional material is anchored to the external surface of the coating). Examples of such additional materials can include cells, biological signaling molecules, vitamins, minerals, pigments, aromas, enzymes, catalysts, antifungals, antimicrobials, and/or time-released drugs. The additional materials can be non-reactive with surface of the agricultural product and/or coating, and/or reactive with the surface and/or coating.

In some embodiments, the coating can include an additive configured, for example, to modify the viscosity, vapor pressure, surface tension, or solubility of the coating. In some embodiments, the additive can be configured to increase the chemical stability of the coating. For example, the additive can be an antioxidant configured to inhibit oxidation of the coating. In some embodiments the additive can be added to reduce or increase the melting temperature or the glass-transition temperature of the coating. In some embodiments, the additive can be configured to reduce the diffusivity of water vapor, oxygen, $CO_2$, or ethylene through the coating or enable the coating to absorb more ultra violet (UV) light, for example to protect the agricultural product (e.g., any of the products described herein). In some embodiments, the additive can be configured to provide an intentional odor, for example a fragrance (e.g., smell of flowers, fruits, plants, freshness, scents, etc.). In some embodiments, the additive can be configured to provide color and can include, for example, a dye or a US Food and Drug Administration (FDA) approved color additive. In some embodiments, the additives can include sweeteners, color additives, flavors, spices, flavor enhancers, fat replacers, and components of formulations used to replace fats, nutrients, emulsifiers, bulking agents, cleansing agents, stabilizers, emulsion stabilizers, thickeners, flavor or fragrance, an ingredient of a flavor or fragrance, binders, texturizers, humectants, pH control agents, acidulants, leavening agents, anti-caking agents, antifungal agents, antimicrobial agents, antioxidants, and/or UV filters. In some embodiments, the coating can include a photoinitiator, which can initiate crosslinking of the coating on exposure to an appropriate light source, for example, UV light.

In some embodiments, any of the plant extract composition coatings described herein can be flavorless or have high flavor thresholds, e.g. above 500 ppm, and can be odorless or have a high odor threshold. In some embodiments, the materials included in any of the coatings described herein can be substantially transparent. For example, the plant extract composition, the solvent, and/or any other additives included in the coating can be selected so that they have substantially the same or similar indices of refraction. By matching their indices of refraction, they may be optically matched to reduce light scattering and improve light transmission. For example, by utilizing materials that have similar indices of refraction and have a clear, transparent property, a coating having substantially transparent characteristics can be formed.

Any of the coatings described herein can be disposed on the external surface of an agricultural product using any suitable means. For example, in some embodiments, the agricultural product can be dip-coated in a bath of the coating formulation (e.g., an aqueous or mixed aqueous-organic or organic solution of the plant extract composition). The deposited coating can form a thin layer on the surface of an agricultural product, which can protect the agricultural product from biotic stressors, water loss, and/or oxidation. In some embodiments, the deposited coating can have a thickness of less than about 1500 nm, such that the coating is transparent to the naked eye. For example, the deposited coating can have a thickness of about 10 nm, about 20 nm, about 30 nm, about 40 nm, about 50 nm, about 100 nm, about 150 nm, about 200 nm, about 250 nm, about 300 nm, about 350 nm, about 400 nm, about 450 nm, about 500 nm, about 550 nm, about 600 nm, about 650 nm, about 700 nm, about 750 nm, about 800 nm, about 850 nm, about 900 nm, about 950 nm, 1,000 nm, about 1,100 nm, about 1,200 nm, about 1,300 nm, about 1,400 nm, or about 1,500 nm, inclusive of all ranges therebetween. In some embodiments, the deposited coating can be uniformly deposited over the agricultural product and free of defects and/or pinholes. In some embodiments, the dip-coating process can include sequential coating of the agricultural product in baths of coating precursors that can undergo self-assembly or covalent bonding on the agricultural product to form the coating.

In some embodiments, the coating can be deposited on agricultural products by passing the agricultural products under a stream of the coating formulation (e.g., a waterfall of the liquid coating). For example, the agricultural products can be disposed on a conveyor that passes through the stream of the coating formulation. In some embodiments, the coating can be misted, vapor- or dry vapor-deposited on the surface of the agricultural product. In some embodiments, the coating can be configured to be fixed on the surface of the agricultural product by UV crosslinking or by exposure to a reactive gas, for example, oxygen.

In some embodiments, the plant extract composition coating can be spray-coated on the agricultural products. Commercially available sprayers can be used for spraying the coating or precursors of the coating onto the agricultural product. In some embodiments, the coating formulation can be electrically charged in the sprayer before spray-coating on to the agricultural product, such that the deposited coating electrostatically and/or covalently bonds to the exterior surface of the agricultural product.

The coating can be configured to prevent water or otherwise moisture loss from the coated portion of the plant, delay ripening, and/or prevent oxygen diffusion into the coated portion of the plant, for example, to reduce oxidation of the coated portion of the plant. The coating can also protect the coated portion of the plant against biotic stressors, such as, for example, bacteria, fungi, viruses, and/or pests that can infest and decompose the coated portion of the plant. Since bacteria, fungi and pests all identify food sources via recognition of specific molecules on the surface of the agricultural product, coating the agricultural products with the coating containing the plant extract compositions can deposit molecularly contrasting molecules on the surface of the portion of the plant, which can render the agricultural products unrecognizable. Furthermore, the coating can also alter the physical and/or chemical environment of the surface of the agricultural product making the surface unfavorable for bacteria, fungi or pests to grow. The coating can also be formulated to protect the surface of the portion of the plant from abrasion, bruising, or otherwise mechanical damage, and/or protect the portion of the plant from photodegradation. The portion of the plant can include, for example, a leaf, a stem, a shoot, a flower, a fruit, a root, etc. In some embodiments, the coating can be used to coat fruits and, for example, delay ripening of the fruit.

Application of Coatings to Produce

Any of the coatings described herein can be disposed on the external surface of an agricultural product using any suitable means. For example, in some embodiments, the agricultural product can be dip coated in a bath of the coating (e.g., an aqueous solution of hydrogen-bonding organic molecules). The coating can form a thin layer on the surface of agricultural product, which can protect the agricultural product from biotic stressors, water loss, and/or oxidation. In some embodiments, the deposited coating can have a thickness of less than about 2 microns, for example less than 1 micron, less than 900 nm, less than 800 nm, less than 700 nm, less than 600 nm, less than 500 nm, less than 400 nm, less than 300 nm, less than 200 nm, or less than 100 nm, such that the coating is transparent to the naked eye. For example, the deposited coating can have a thickness of about 50 nm, 60 nm, 70 nm, 80 nm, 90 nm, 100 nm, 110 nm, 120 nm, 130 nm, 140 nm, 150 nm, 200 nm, 250 nm, 300 nm, 350 nm, 400 nm, 450 nm, 500 nm, 600 nm, 700 nm, 800 nm, 900 nm, or about 1,000 nm inclusive of all ranges therebetween. The deposited coating can have a high degree of crystallinity to decrease permeability, such that the coating is conformally deposited over the agricultural product and is free of defects and/or pinholes. In some embodiments, the dip coating process can include sequential coating of the agricultural product in baths of precursors that can undergo self-assembly or covalent bonding on the agricultural product to form the coating. In some embodiments, the coatings can be deposited on agricultural products by passing the agricultural products under a stream of the coating (e.g., a waterfall of the liquid coating). For example, the agricultural products can be disposed on a conveyor that passes through the stream of the coating. In some embodiments, the coating can be vapor deposited on the surface of the agricultural product. In some embodiments, the coating can be formulated to be fixed on the surface of the agricultural product by UV cross-linking or by exposure to a reactive gas, for example, oxygen. In some embodiments, the coating can be applied in the field before harvest as an alternative to pesticides.

In some embodiments, the functionalized cutin-derived monomers, oligomers, or combinations thereof are dissolved in a suitable solvent (e.g., water, ethanol, or a combination thereof) prior to coating the agricultural product.

In some embodiments the process of disposing the composition on the agricultural product comprises dip-coating the agricultural product in a solution comprising the plurality of cutin-derived monomers, oligomers, or combinations thereof. In some embodiments the process of disposing the composition on the agricultural product comprises spray-coating the produce with a solution comprising the plurality of cutin-derived monomers, oligomers, or combinations thereof.

In some embodiments, any of the coatings can be spray coated on the agricultural products. Commercially available sprayers can be used for spraying the coating or precursors of the coating onto the agricultural product. In some embodiments, the coatings can be electrically charged in the sprayer before spray coating on the agricultural product, such that the coating covalently bonds to the exterior surface of the agricultural product.

In some embodiments, the coating can be deposited on the agricultural product such that the coating is unbound to the surface of the agricultural product. In some embodiments, one or more components of the coating, for example, the hydrogen-bonding organic molecule, can be covalently (or hydrogen) bonded to at least a portion of the surface of the agricultural product. This can result in improved coating properties such as, for example, higher durability, tighter control of coating permeability and thickness. In some embodiments, multiple layers of the coating can be deposited on the surface of agricultural product to achieve a durable coating.

In some embodiments the plant extract composition comprises a plurality of cutin-derived monomers, oligomers, or combinations thereof and a solvent selected from water, ethanol, and combinations thereof. In some embodiments the method causes one or more of the cutin monomers to cross-link on the surface of the produce.

Any of the coatings described herein can be used to protect any agricultural product. In some embodiments, the coating can be coated on an edible agricultural product, for example, fruits, vegetables, edible seeds and nuts, herbs, spices, produce, meat, eggs, dairy products, seafood, grains, or any other consumable item. In such embodiments, the coating can include components that are non-toxic and safe for consumption by humans and/or animals. For example, the coating can include components that are U.S. Food and Drug Administration (FDA) approved direct or indirect food additives, FDA approved food contact substances, satisfy FDA regulatory requirements to be used as a food additive or food contact substance, and/or is an FDA Generally Recognized as Safe (GRAS) material. Examples of such materials can be found within the FDA Code of Federal Regulations Title 21, located at "http://www.accessdata.fda-.gov/scripts/cdrh/cfdocs/cfcfr/cfrsearch.cfm", the entire contents of which are hereby incorporated by reference herein. In some embodiments, the components of the coating can include a dietary supplement or ingredient of a dietary supplement. The components of the coating can also include an FDA approved food additive or color additive. In some embodiments, the coating can include components that are naturally derived, as described herein. In some embodiments, the coating can be flavorless or have a high flavor threshold of below 500 ppm, are odorless or have a high odor threshold, and/or are substantially transparent. In some embodiments, the coating can be configured to be washed off an edible agricultural product, for example, with water.

In some embodiments, the coating described herein can be coated on an inedible agricultural product. Such inedible agricultural products can include, for example, inedible flowers, seeds, shoots, stems, leaves, whole plants, and the likes. In such embodiments, the coating can include components that are non-toxic but the threshold level for non-toxicity can be higher than that prescribed for edible products. In such embodiments, the coating can include an FDA approved food contact substance, an FDA approved food additive, or an FDA approved drug ingredient, for example, any ingredient included in the FDA's database of approved drugs, which can be found at "http://www.accessdata.fda-.gov/scripts/cder/drugsatfda/index.cfm", the entire contents of which are hereby incorporated herein by reference. In some embodiments, the coating can include materials that satisfy FDA requirements to be used in drugs or are listed within the FDA's National Drug Discovery Code Directory, "http://www.accessdata.fda.gov/scripts/cder/ndc/default-.cfm", the entire contents of which are hereby incorporated herein by reference. In some embodiments, the materials can include inactive drug ingredients of an approved drug product as listed within the FDA's database, "http://www.accessdata.fda.gov/scripts/cder/ndc/default.cfm", the entire contents of which are hereby incorporated herein by reference.

Embodiments of the coatings described herein provide several advantages, including, for example: (1) the coatings can protect the agricultural products from biotic stressors, i.e. bacteria, viruses, fungi, or pests; (2) the coatings can prevent evaporation of water and/or diffusion of oxygen; (3) coating can help extend the shelf life of agricultural products, for example, post-harvest produce, without refrigeration; (4) the coatings can introduce mechanical stability to the surface of the agricultural products eliminating the need for expensive packaging designed to prevent the types of bruising which accelerate spoilage; (5) use of agricultural waste materials to obtain the coatings can help eliminate the breeding environments of bacteria, fungi, and pests; (6) the coatings can be used in place of pesticides to protect plants, thereby minimizing the harmful impact of pesticides to human health and the environment; (7) the coatings can be naturally derived and hence, safe for human consumption. Since the components of the coatings described herein can in some embodiments be obtained from agricultural waste, such coatings can be made at a relatively low cost. Therefore, the coatings can be particularly suited for small scale farmers, for example, by reducing the cost required to protect crops from pesticides and reducing post-harvest losses of agricultural products due to decomposition by biotic and/or environmental stressors.

The following examples describe plant extract compositions obtained using the methods described herein. These examples are only for illustrative purposes and are not meant to limit the scope of the present disclosure.

EXAMPLES

All reagents and solvents were purchased and used without further purification unless specified. Palmitic acid (98%) was purchased from Sigma-Aldrich. p-TsOH and MTBE were purchased from Alfa-Aesar. Toluene, $Et_2O$, and EtOAc were purchased from VWR. Lipozyme® TL IM lipase was purchased from Novozymes. 10 wt % Pd/C was purchased from Strem Chemicals and used as received. All reactions were carried out under an atmosphere of air with non-dried solvents unless otherwise stated. Yields refer to chromatographically and spectroscopically ($^1$H NMR) homogeneous materials, unless otherwise stated. Reactions were monitored by thin layer chromatography (TLC) carried out on 0.25 mm E. Merck silica gel plates (60 Å, F-254) using UV light as the visualizing agent and an acidic mixture of anisaldehyde, ceric ammonium molybdate, or basic aqueous potassium permanganate ($KMnO_4$), and heat as developing agents. NMR spectra were recorded on a Bruker Avance 500 MHz and/or Varian VNMRs 600 MHz instruments and calibrated using residual un-deuterated solvent as an internal reference ($CHCl_3$ @ 7.26 ppm $^1$H NMR, 77.16 ppm $^{13}$C NMR). The following abbreviations (or combinations thereof) were used to explain the multiplicities: s=singlet, d=doublet, t=triplet, q=quartet, m=multiplet, br=broad. Mass spectra (MS) were recorded on a time of-flight mass spectrometer by electrospray ionization (ESI) or field desorption (FD) at the UC Santa Barbara mass spectrometry facility. 1,3-bis(benzyloxy)propan-2-ol was synthesized according to the procedure of Nemoto et al. (*J. Org. Chem.*, 1992, 57, p. 435).

The following abbreviations are used in the following examples and throughout the specification:
DCC=N,N'-Dicyclohexylcarbodiimide
DCM=dichloromethane
DMAP=Dimethylamino pyridine
DMF=N,N-dimethylformamide
MBTE='BME=tert-butylmethyl ether
p-TsOH=para toluenesulfonic acid
TBS=TBDPS=tert-butyldimethyl silyl Example 1: Plant Extract Composition Obtained from Tomato Skin/Peel-I Whole tomatoes were cut in to halves or quarters and boiled in water until the skins were visibly loosened. The skins were mechanically separated from the tomato flesh using a food mill to remove as much of the fruit flesh and seeds from the peels as possible. The separated peels were then heated in an aqueous solution of about 16 grams per liter ammonium oxalate and about 4 grams per liter oxalic acid at 75 degrees Celsius for about 16 hours to disrupt the pectinaceous glue present between the cuticular layer and the underlying tomato flesh. The remaining peel including the cutin was isolated by filtration, rinsed with water, and oven-dried at 65 degrees Celsius to remove residual moisture prior to depolymerization. The skin (i.e., the cutin-containing portion) was depolymerized in a methanolic solution including a stoichiometric excess of potassium hydroxide (relative to tomato skin) at about 65 degrees Celsius for about 24 hours. The resulting solution was filtered to remove any leftover solids and the filtrate was collected. Any excess solvent was removed from the filtered solution by rotary evaporation. The crude solid was redissolved in distilled water and chilled in an ice bath, and the pH of the resulting solution was adjusted to about 2 by adding aqueous HCl to the solution. The depolymerized multifunctional fatty acid monomers and oligomers of the cutin were solidified by precipitating from solution or by evaporation and the monomers were isolated by filtration to yield the tomato peel extract. The tomato peel extract was purified using column chromatography using a 3:1 volumetric ratio of hexane:acetone. The tomato peel extract included 70 wt % 10,16-dihydroxyhexadecanoic acid, 5 wt % 16-hydroxyhexadecanoic acid, 3 wt % 9,10,18-trihydroxyoctadecanoic acid, and 22 wt % residual fatty acids and other plant by-products.

Example 2: Plant Extract Composition Obtained from Tomato Skin/Peel-II

Dried tomato peels and pomace obtained directly from an industrial tomato processing facility were ground to a fine powder using an electric grinder and then directly subjected to depolymerization. The waste (i.e., cutin-containing peels and pomace) was depolymerized in a methanolic solution including a stoichiometric excess of potassium hydroxide (relative to tomato waste) at about 65 degrees Celsius for about 24 hours. The resulting solution was filtered to remove any leftover solids and the filtrate was collected. Any excess solvent was removed from the filtered solution by rotary evaporation. The crude solid was redissolved in distilled water and chilled in an ice bath, and the pH of the resulting solution was adjusted to about 2 by adding aqueous HCl to the solution. The depolymerized multifunctional fatty acid monomers and oligomers of the cutin were solidified by precipitating from solution or by evaporation and the monomers were and isolated by filtration to yield the crude tomato peel extract. The dried crude tomato peel extract was dry-loaded onto Celite and subjected to Soxhlet extraction with acetonitrile for 1 day. The solution in the solvent reservoir below the Soxhlet apparatus was collected and excess solvent was removed by rotary evaporator to yield a purified, resolidified, tomato peel extract.

Example 3: Plant Extract Composition Obtained from Cranberry

Cranberries were diced and boiled in water until their skins were visibly loosened. The aqueous mixture containing berry flesh and berry skins was then subjected to sonication to mechanically detach the berry flesh from the skins. The mixture was sonicated for 5-10 minutes at a time. Sonication was applied in alternation with filtration of the aqueous berry mixture through a coarse filter whereby the filter cake was washed with distilled water to eliminate fine debris and isolate a filter cake increasingly enriched in berry skin. The sonication and filtration steps were continued in alternation until the majority of the berry flesh was removed from the berry skin-enriched final filter cake. After oven-drying at 65 degrees Celsius to remove residual moisture, the cranberry skins were next subjected to a first Soxhlet extraction with chloroform for 2 days followed by a second Soxhlet extraction with methanol for 1 day. The cutin-rich skins were subsequently depolymerized in a methanolic solution including a stoichiometric excess of potassium hydroxide (relative to cranberry skin) at about 65 degrees Celsius for about 24 hours. The resulting solution was filtered to remove any leftover solids and the filtrate was collected. Any excess solvent was removed from the filtered solution by rotary evaporation. The crude solid was redissolved in distilled water and chilled in an ice bath, and the pH of the resulting solution was adjusted to about 2 by adding aqueous HCl to the solution. The depolymerized multifunctional fatty acid monomers and oligomers of the cranberry cutin were solidified by precipitating from solution or by evaporation and the monomers were isolated by filtration to yield the cranberry skin extract. The cranberry extract was purified using column chromatography using a 3:1 volumetric ratio of hexane:acetone.

Example 4: Plant Extract Composition Obtained from Grape Berry

White grape pressings leftover from winemaking were boiled in water until their skins were visibly loosened. The aqueous mixture containing grape flesh and grape skins was then subjected to sonication to mechanically detach the grape flesh from the grape skins. The mixture was sonicated for 5-10 minutes at a time. Sonication was applied in alternation with filtration of the aqueous berry mixture through a coarse filter whereby the filter cake was washed with distilled water to eliminate seeds and fine debris and isolate a filter cake increasingly enriched in grape skin. The sonication and filtration steps were continued in alternation until approximately half of the berry flesh (volumetrically) was removed from the final grape skin-enriched filter cake. The filter cake was then subjected to enzymatic treatment to detach any remaining grape flesh from the grape skins. The filter cake was dispersed into an aqueous buffer solution (0.2 mM acetate, pH 4) containing 0.1 wt % cellulase and 0.1 wt % pectinase and shaken on an orbital shaker at 40 degrees Celsius and 200 rpm for 24 hours. The aqueous mixture was then filtered through a coarse filter and washed with distilled water to obtain a filter cake enriched with cutin-containing grape skin. After oven-drying at 65 degrees Celsius to remove residual moisture, the grape skins were next subjected to a first Soxhlet extraction with chloroform for 2 days followed by a second Soxhlet extraction with methanol for 1 day. The cutin-rich skins were subsequently depolymerized in a methanolic solution including a stoichiometric excess of potassium hydroxide (relative to grape skin) at about 65 degrees Celsius for about 24 hours. The resulting solution was filtered to remove any leftover solids and the filtrate was collected. Any excess solvent was removed from the filtered solution by rotary evaporation. The crude solid was redissolved in distilled water and chilled in an ice bath, and the pH of the resulting solution was adjusted to about 2 by adding aqueous HCl to the solution. The depolymerized multifunctional fatty acid monomers and oligomers of the cutin were solidified by precipitating from solution or by evaporation and the monomers were isolated by filtration to yield the grape skin extract. The grape skin extract was purified using column chromatography using a 3:1 volumetric ratio of hexane:acetone.

Example 5: Plant Extract Composition Obtained from Tomato Skin/Peel and Agricultural Coating Formed Thereof Dried tomato peels or pomace obtained directly from an industrial tomato processing facility were ground to a fine powder using an electric grinder and then directly subjected to depolymerization. The cutin-containing peels or pomace were depolymerized in two batches of an ethanolic mixture (e.g., a first solvent) that were each substantially free of water (e.g., less than 5% water by mass). The ethanolic mixture was formed by adding sodium metal to ethanol under inert conditions, generating sodium ethoxide within the mixture. The cutin-containing peels and pomace were then added to the first and second batches of the ethanolic mixture. The resulting solutions were heated to and held at reflux under inert atmosphere. The reaction proceeded for 24 hours for the first batch and 48 hours for the second batch, resulting in respective first and second solutions which each included crude sodium 10,16-dihydroxyhexadecanoate.

Figure 7:
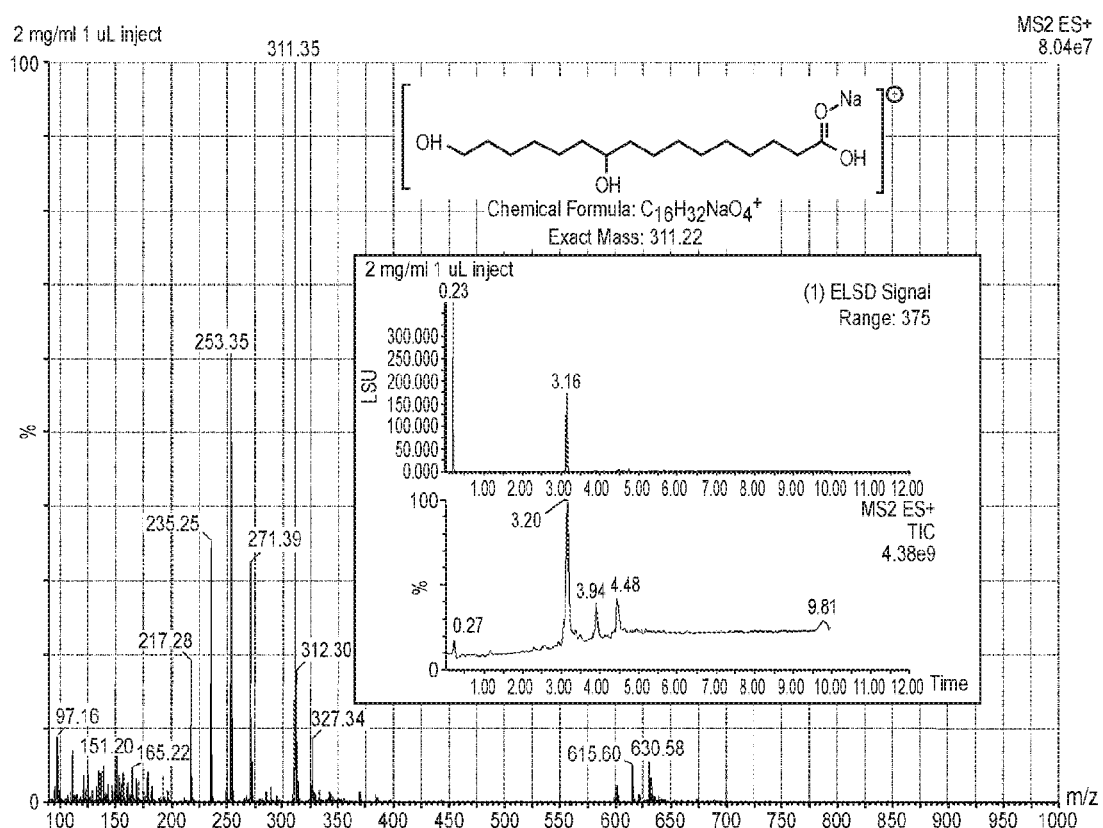
FIG. 7 shows plots of purity data of an extract composition described herein.
Figure 8:
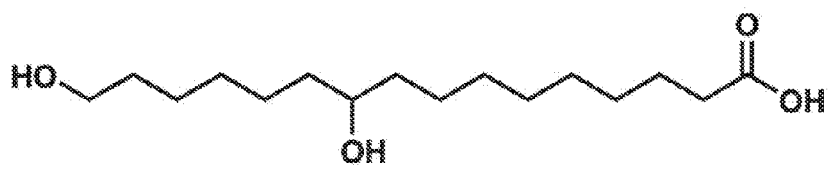
FIG. 8 is an elemental analysis of an extract composition described herein.

The solutions were each then cooled to room temperature and acidified to a pH of about 7 by addition of 3M HCl. The acidified solutions were then filtered to remove any insoluble salts, unreacted material, and other impurities, and the filtrates were evaporated to dryness. The resulting materials were each then re-dissolved in methanol and absorbed onto 3× their respective mass of Celite by evaporating the solvent. The adsorbed mixtures were then Soxhlet extracted sequentially by heptane, ethyl acetate, and methanol. Separation of the 10,16-dihydroxypalmitic acid from other species and impurities within the adsorbed mixtures was monitored by UPLC-MS (ESI+). The 10,16-dihydroxypalmitic acid preferentially partitioned into the ethyl acetate, with less polar impurities extracting from the Celite into the heptane wash, and the more polar impurities extracting into the methanol wash. The obtained extract composition from each of the two batches was a yellow to colorless free flowing powder after evaporation of the solvent. The powders from each of the two batches were then combined into a single composition. FIG. 7 shows purity data, obtained using mass spectrometry and FIG. 8 shows elemental analysis, of the resulting powder, indicating a high level of purity.

A first portion of the 10,16-dihydroxypalmitic acid of the composition was then functionalized to form ethyl 10,16-dihydroxypalmitate, while a second portion was functionalized to form 2,3-dihydroxypropyl 10,16-dihydroxypalmitate (i.e., the 1-monoacylglycerideester of 10,16-dihydroxypalmitic acid). The ethyl 10,16-dihydroxypalmitate was prepared by Fisher esterification of the 10,16-dihydroxypalmitic acid in ethanol using sulfuric acid as a catalyst. The 2,3-dihydroxypropyl 10,16-dihydroxypalmitate was prepared by reaction of the 10,16-dihydroxypalmitic acid with glycidol under basic catalysis.

The ethyl 10,16-dihydroxypalmitate was then dissolved in substantially pure ethanol at a concentration of 67 mg/mL to form a first extract composition, and the 2,3-dihydroxypropyl 10,16-dihydroxypalmitate was dissolved in substantially pure ethanol at a concentration of 37 mg/mL to form a second extract composition. Finally, agricultural coatings were formed from the first extract composition on a first set of key limes and from the second extract composition on a second set of key limes using the following process. The first and second extract compositions were poured into respective first and second plastic bags. 10 key limes were then placed in each bag, and the bags were each agitated for about 10 seconds to ensure that the extract compositions covered the entirety of each key lime. The key limes were then removed and placed on dryings racks, and the solvent allowed to evaporate. This resulted in about 20 mg of the ethyl 10,16-dihydroxypalmitate extract being deposited over each key lime of the first set of key limes, and about 11 mg of the 2,3-dihydroxypropyl 10,16-dihydroxypalmitate extract being deposited over each key lime of the second set of key limes.

Figure 9:
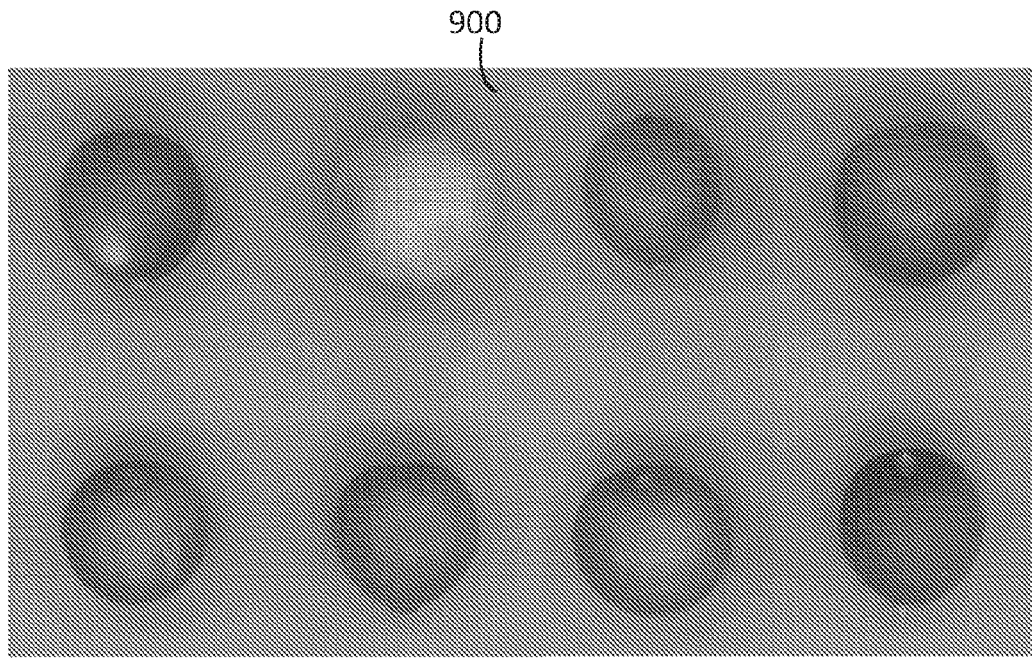
FIG. 9 shows high resolution photographs of uncoated key limes.
Figure 10:
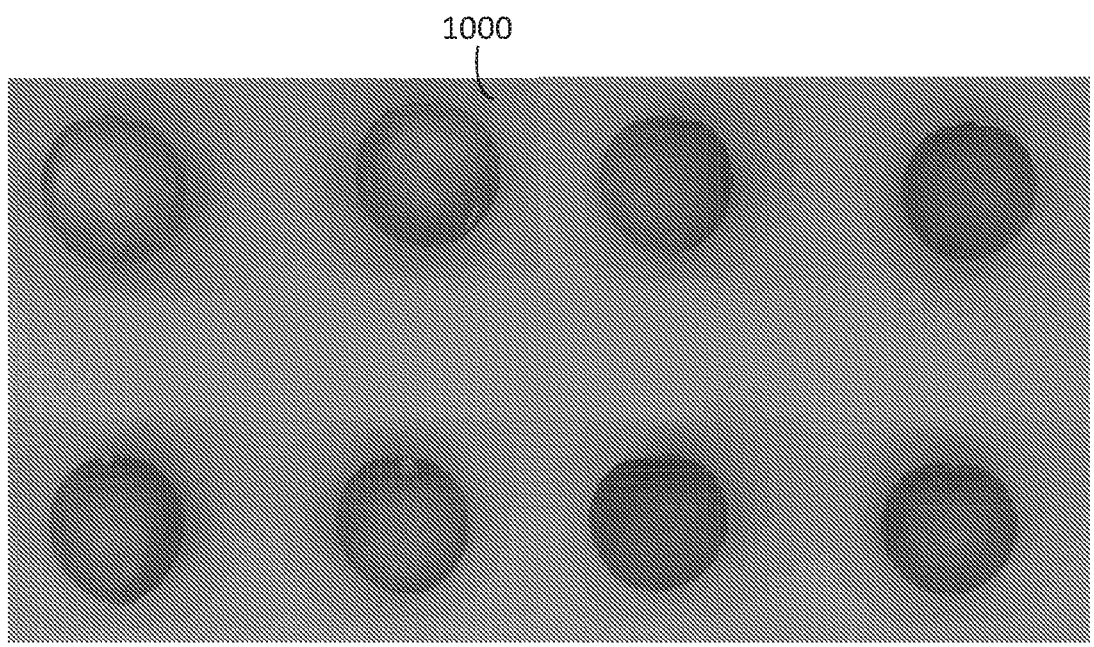
FIG. 10 shows high resolution photographs of key limes coated with compounds of a first extract.
Figure 11:
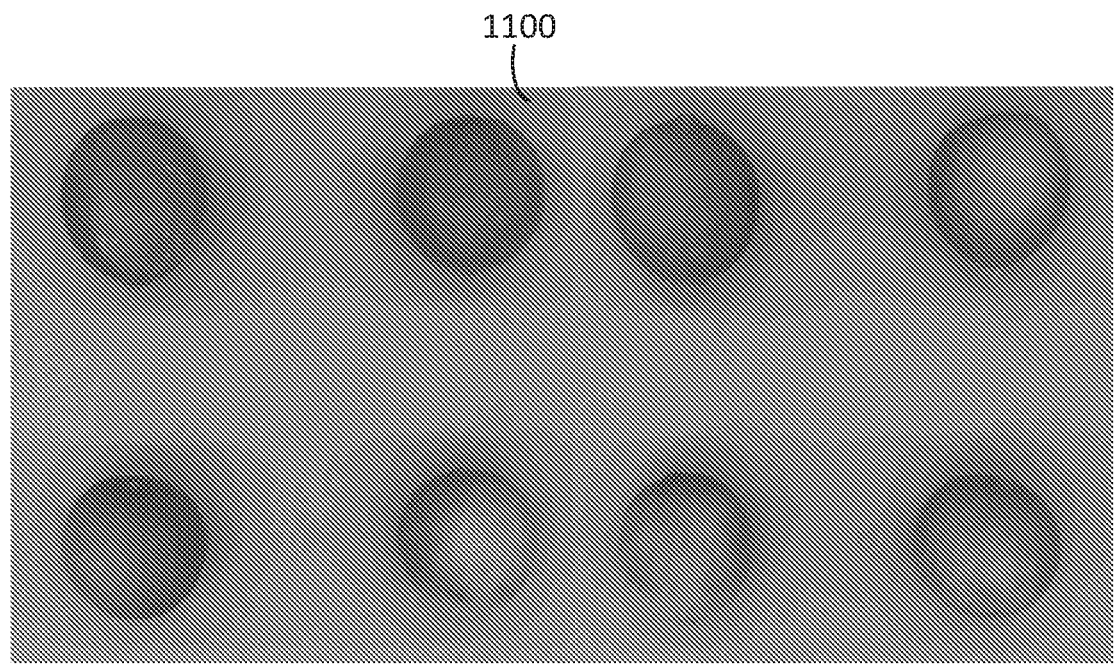
FIG. 11 shows high resolution photographs of key limes coated with compounds of a second extract.

FIGS. 9-11 are high resolution photographs of untreated key limes. FIG. 9 shows untreated key limes 900. FIG. 10 shows key limes coated with the plant extracts of the first extract composition (1000). FIG. 11 shows key limes coated with the plant extracts of the second extract composition (1100). Each photograph was taken approximately 24 hours after the coatings were formed. The coatings formed from both extract compositions were translucent and substantially undetectable to the human eye. However, the coating formed from the second extract composition reduced the glossiness of the key limes, whereas the glossiness of key limes coated with the first extract composition was maintained.

Example 6: Synthesis of 1,3-dihydroxypropan-2-yl Palmitate

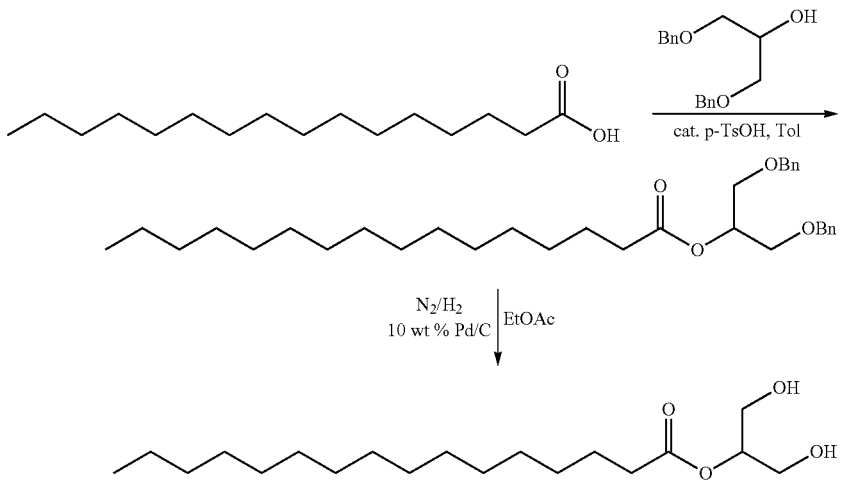

Step 1. 1,3-bis(benzyloxy)propan-2-yl palmitate

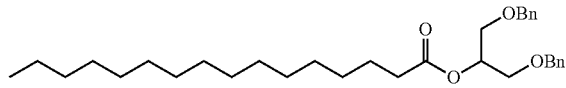 [SMILES: CCCCCCCCCCCCCCCC(=O)OC(COCc1ccccc1)COCc1ccccc1]

70.62 g (275.34 mmole) of palmitic acid, 5.24 g (27.54 mmole) of p-TsOH, 75 g (275.34 mmole) of 1,3-bis(benzyloxy)propan-2-ol, and 622 mL of toluene were charged into a round bottom flask equipped with a Teflon coated magnetic stir bar. A Dean-Stark Head and condenser were attached to the flask and a positive flow of $N_2$ was initiated. The flask was heated to reflux in a heating mantle while the reaction mixture was stirred vigorously until the amount of water collected (~5 mL) in the Dean-Stark Head indicated full ester conversion (~8 hr). The flask was allowed to cool down to room temperature and the reaction mixture was poured into a separatory funnel containing 75 mL of a saturated aqueous solution of $NaCO_3$ and 75 mL of brine. The toluene fraction was collected and the aqueous layer was extracted with 125 mL of $Et_2O$. The organic layers were combined and washed with 100 mL of brine, dried over $MgSO_4$, filtered and concentrated in vacuo. The crude colorless oil was dried under high vacuum providing (135.6 g, 265.49 mmole, crude yield=96.4%) of 1,3-bis(benzyloxy)propan-2-yl palmitate.

HRMS (ESI-TOF) (m/z): calcd. for $C_{33}H_{50}O_4Na$, [M+Na]$^+$, 533.3607; found, 533.3588;

$^1$H NMR (600 MHz, CDCl$_3$): δ 7.41-7.28 (m, 10H), 5.28 (p, J=5.0 Hz, 1H), 4.59 (d, J=12.1 Hz, 2H), 4.54 (d, J=12.1 Hz, 2H), 3.68 (d, J=5.2 Hz, 4H), 2.37 (t, J=7.5 Hz, 2H), 1.66 (p, J=7.4 Hz, 2H), 1.41-1.15 (m, 24H), 0.92 (t, J=7.0 Hz, 3H) ppm.

$^{13}$C NMR (151 MHz, CDCl$_3$): δ 173.37, 138.09, 128.43, 127.72, 127.66, 73.31, 71.30, 68.81, 34.53, 32.03, 29.80, 29.79, 29.76, 29.72, 29.57, 29.47, 29.40, 29.20, 25.10, 22.79, 14.23 ppm.

Step 2. 1,3-dihydroxypropan-2-yl palmitate

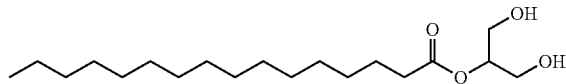 [SMILES: CCCCCCCCCCCCCCCC(=O)OC(CO)CO]

7.66 g (15.00 mmoles) of 1,3-bis(benzyloxy)propan-2-yl palmitate, 79.8 mg (0.75 mmole) of 10 wt % Pd/C and 100 mL of EtOAc were charged to a 3 neck round bottom flask equipped with a Teflon coated magnetic stir bar. A cold finger, with a bubbler filled with oil attached to it, and a bubbling stone connected to a 1:4 mixture of $H_2/N_2$ gas tank were affixed to the flask. $H_2/N_2$ was bubbled at 1.2 LPM into the flask until the disappearance of both starting material and mono-deprotected substrate as determined by TLC (~60 min). Once complete, the reaction mixture was filtered through a plug of Celite, which was then washed with 100 mL of EtOAc. The filtrate was placed in a refrigerator at 4° C. for 24 hrs. The precipitate from the filtrate (white and transparent needles) was filtered and dried under high vacuum yielding (2.124 g, 6.427 mmole, yield=42.8%) of 1,3-dihydroxypropan-2-yl palmitate.

HRMS (FD-TOF) (m/z): calcd. for $C_{19}H_{38}O_4$, 330.2770; found, 330.2757;

$^1$H NMR (600 MHz, CDCl$_3$): δ 4.93 (p, J=4.7 Hz, 1H), 3.84 (t, J=5.0 Hz, 4H), 2.37 (t, J=7.6 Hz, 2H), 2.03 (t, J=6.0 Hz, 2H), 1.64 (p, J=7.6 Hz, 2H), 1.38-1.17 (m, 26H), 0.88 (t, J=7.0 Hz, 3H) ppm.

$^{13}$C NMR (151 MHz, CDCl$_3$): δ 174.22, 75.21, 62.73, 34.51, 32.08, 29.84, 29.83, 29.81, 29.80, 29.75, 29.61, 29.51, 29.41, 29.26, 25.13, 22.85, 14.27 ppm.

Example 7: Synthesis of 1,3-dihydroxypropan-2-yl Palmitate by Enzyme Catalysis

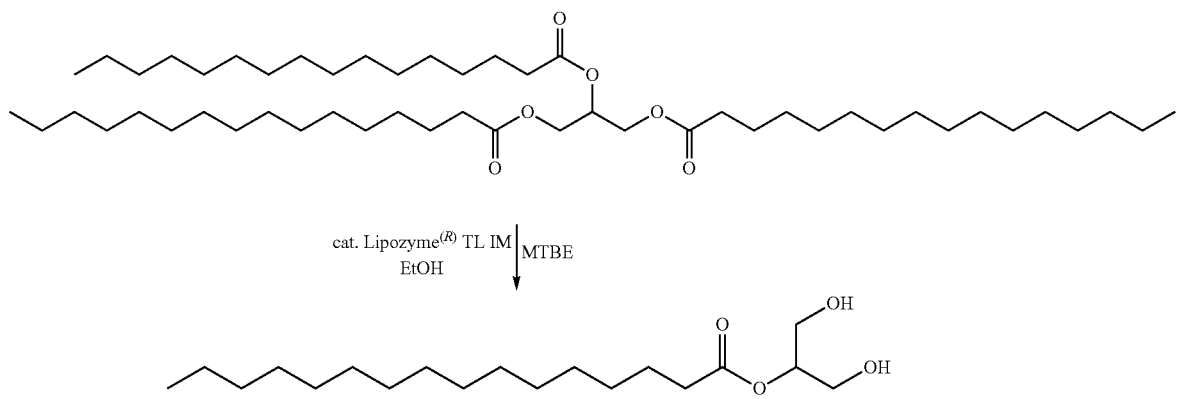

3.66 g (4.50 mmoles) of tripalmitin, 7.26 mg of Lipozyme® TL-IM lipase, 2.65 mL of EtOH, and 363 mL of MTBE were charged to a round bottom flask equipped with a Teflon coated magnetic stir bar. The reaction mixture was stirred for 15 min at room temperature, filtered, and concentrated in vacuo. 15 mL of hexanes was added to the crude product and the product/hexanes mixture was stored in a refrigerator at 4° C. for 24 hrs. The crude mixture was filtered, washed with 30 mL of cold hexanes, and dried under high vacuum yielding 1.256 g (3.8 mmole, yield=84.4%) of 1,3-dihydroxypropan-2-yl palmitate. (Note: yield is based on total mass being from 1,3-dihydroxypropan-2-yl palmitate, however it contains 12.16 mole % (20 wt %) of diacylglycerol palmitate.)

HRMS (FD-TOF) (m/z): calcd. for $C_{19}H_{38}O_4$, 330.2770; found, 330.2757;

¹H NMR (600 MHz, CDCl₃): δ 4.93 (p, J=4.7 Hz, 1H), 3.84 (t, J=5.0 Hz, 4H), 2.37 (t, J=7.6 Hz, 2H), 2.03 (t, J=6.0 Hz, 2H), 1.64 (p, J=7.6 Hz, 2H), 1.38-1.17 (m, 26H), 0.88 (t, J=7.0 Hz, 3H) ppm.

¹³C NMR (151 MHz, CDCl₃): δ 174.22, 75.21, 62.73, 34.51, 32.08, 29.84, 29.83, 29.81, 29.80, 29.75, 29.61, 29.51, 29.41, 29.26, 25.13, 22.85, 14.27 ppm.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of preparing a plant extract composition, comprising:
    obtaining cutin from a cutin-containing portion of a plant matter, the cutin-containing portion being at least partially separated from a non-cutin-containing portion of the plant matter;
    at least partially depolymerizing the cutin in a first solvent to obtain a first solution comprising a first intermediate extract dissolved in the first solvent, the first intermediate extract including a plurality of cutin-derived monomers, oligomers, or combinations thereof:
    acidifying the first intermediate extract:
    selectively filtering the first intermediate extract to obtain a second intermediate extract having a higher purity than the first intermediate extract;
    functionalizing the cutin-derived monomers, oligomers, or combinations thereof of the second intermediate extract by esterification; and
    dissolving the functionalized second intermediate extract in a second solvent to obtain the plant extract composition.

2. The method of claim 1, wherein obtaining the second intermediate extract includes removing the second intermediate extract from the first solvent.

3. The method of claim 2, wherein the first solvent includes at least one of chloroform, hexane, acetonitrile, and ethyl acetate.

4. The method of claim 1, wherein selectively filtering the first intermediate extract includes solidifying the first intermediate extract and washing the solidified first intermediate extract in a selective solvent.

5. The method of claim 1, wherein the first solution has a pH in the range of 10 to 14.

6. The method of claim 1, wherein the first solvent is less than 5% water by mass.

7. The method of claim 6, wherein the first solvent comprises at least one of ethanol and methanol.

8. A method of preparing a plant extract composition, comprising:
    obtaining cutin from a cutin-containing portion of a plant matter, the cutin-containing portion being at least partially separated from the non-cutin-containing portion of the plant matter;
    at least partially depolymerizing the cutin in a first solvent, the first intermediate extract including a plurality of cutin-derived monomers, oligomers, or combinations thereof;
    selectively filtering the first intermediate extract to obtain a second intermediate extract having a higher purity than the first intermediate extract, the second intermediate extract including at least one of the cutin-derived monomers, oligomers, or combinations thereof; and
    functionalizing the cutin-derived monomers, oligomers, or combinations thereof of the second intermediate extract by esterification to form the plant extract composition.

9. The method of claim 8, further comprising:
    causing the plant extract composition to be applied to a plant or agricultural product to form a protective coating over the plant or agricultural product.

10. The method of claim 9, wherein the plant or agricultural product to which the plant extract composition is applied is different from the plant from which the cutin is obtained.

11. The method of claim 8, wherein functionalizing the cutin-derived monomers, oligomers, or combinations thereof comprises glycerating the cutin-derived monomers, oligomers, or combinations thereof to form monoacylglyceride compounds.

12. The method of claim 8, wherein functionalizing the cutin-derived monomers, oligomers, or combinations thereof comprises esterifying the cutin-derived monomers, oligomers, or combinations thereof to form ethyl esters.

13. A method of preserving an agricultural product, comprising:
    obtaining a plant extract composition comprising a plurality of cutin-derived monomers, oligomers, or combinations thereof;
    functionalizing the cutin-derived monomers, oligomers, or combinations thereof by esterifying the cutin-derived monomers, oligomers, or combinations thereof with a glycerol molecule; and
    causing the agricultural product to be coated with the functionalized cutin-derived monomers, oligomers, or combinations thereof.

14. The method of claim 13, wherein the cutin-derived monomers, oligomers, or combinations thereof comprise fatty acids.

15. The method of claim 14, wherein the fatty acids are palmitic acid or 10-16-dihydroxyhexadecanoic acid.

16. The method of claim 13, wherein obtaining the plant extract composition comprises at least partially depolymerizing cutin derived from plant matter.

17. The method of claim 13, wherein the functionalized cutin-derived monomers, oligomers, or combinations thereof are dissolved in a solvent prior to coating the agricultural product.

18. The method of claim 17, wherein the solvent is water, ethanol, or a combination thereof.

19. The method of claim 13, wherein the process of coating the agricultural product with the functionalized cutin-derived monomers, oligomers, or combinations thereof comprises dip-coating or spray-coating of the agricultural product with a solution comprising the functionalized cutin-derived monomers, oligomers, or combinations thereof.

20. The method of claim 13, wherein the process of coating the agricultural product with the functionalized cutin-derived monomers, oligomers, or combinations thereof causes one or more of the functionalized cutin-derived monomers or oligomers to cross-link on the surface of the product.

21. The method of claim 13, wherein the cutin-derived monomers, oligomers, or combinations thereof are functionalized by esterifying as a 1-glycerol or a 2-glycerol ester.

22. The method of claim 13, wherein the functionalized cutin-derived monomers, oligomers, or combinations thereof are not naturally occurring on the surface of the agricultural product.

23. A method of treating an agricultural product, comprising:
  obtaining a plant extract composition comprising a plurality of monomers, oligomers, or combinations thereof, wherein the monomers, oligomers or combinations thereof comprise fatty acids or esters;
  functionalizing the monomers, oligomers, or combinations thereof by esterification; and
  causing the agricultural product to be coated with the functionalized monomers, oligomers, or combinations thereof.

24. The method of claim 23, wherein obtaining the plant extract composition comprises at least partially depolymerizing cutin derived from plant matter.

25. The method of claim 23, wherein the functionalized monomers, oligomers, or combinations thereof are dissolved in a solvent prior to coating the agricultural product.

26. The method of claim 25, wherein the solvent is ethanol, water, or a combination thereof.

27. The method of claim 23, wherein the process of coating the agricultural product with the functionalized monomers, oligomers, or combinations thereof comprises dip-coating or spray-coating of the agricultural product with a solution comprising the functionalized monomers, oligomers, or combinations thereof.

28. The method of claim 23, wherein the process of coating the agricultural product with the functionalized monomers, oligomers, or combinations thereof causes one or more of the functionalized monomers or oligomers to cross-link on the surface of the agricultural product.

29. The method of claim 23, wherein the monomers, oligomers, or combinations thereof are functionalized by esterifying as a 1-glycerol or a 2-glycerol ester.

30. The method of claim 23, wherein the functionalized monomers, oligomers, or combinations thereof are not naturally occurring on the surface of the agricultural product.

* * * * *

UNITED STATES PATENT AND TRADEMARK OFFICE
CERTIFICATE OF CORRECTION

PATENT NO. : 9,743,679 B2
APPLICATION NO. : 15/254263
DATED : August 29, 2017
INVENTOR(S) : Louis Perez et al.

It is certified that error appears in the above-identified patent and that said Letters Patent is hereby corrected as shown below:

In Claim 8, at Column 42, Line 2, after the phrase "in a first solvent" and before the ",", please insert the phrase -- to obtain a first solution comprising a first intermediate extract in the first solvent --.

Signed and Sealed this
Nineteenth Day of June, 2018

Andrei Iancu
*Director of the United States Patent and Trademark Office*